United States Patent
Matsui et al.

(10) Patent No.: US 6,451,728 B1
(45) Date of Patent: Sep. 17, 2002

(54) OLEFIN POLYMERIZATION CATALYST AND PROCESS FOR OLEFIN POLYMERIZATION

(75) Inventors: Shigekazu Matsui; Masatoshi Nitabaru; Yasunori Yoshida; Makoto Mitani; Terunori Fujita, all of Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/458,060

(22) Filed: Dec. 10, 1999

(30) Foreign Application Priority Data

Dec. 11, 1998 (JP) ............................................ 10-353548
Jul. 1, 1999 (JP) ............................................ 11-187781

(51) Int. Cl.[7] ......................... B01J 31/00; B01J 37/00; C08F 4/02; C08F 4/60; C08F 4/44
(52) U.S. Cl. ..................... 502/167; 502/103; 502/167; 502/155; 502/162; 526/161; 526/172
(58) Field of Search ................. 502/162, 167, 502/155, 117, 103; 526/161, 172

(56) References Cited

U.S. PATENT DOCUMENTS

| | | | | |
|---|---|---|---|---|
| 4,994,534 A | * | 2/1991 | Rhee et al. ................. | 526/88 |
| 5,304,588 A | * | 4/1994 | Boysen et al. ................. | 523/204 |
| 6,200,925 B1 | * | 3/2001 | Ponasik, Jr. et al. ........ | 502/167 |
| 6,309,997 B1 | * | 10/2001 | Fujita et al. ................. | 502/155 |

FOREIGN PATENT DOCUMENTS

| | | |
|---|---|---|
| DE | 99556 | 8/1973 |
| JP | 60249143 | 12/1985 |
| WO | WO 96/00245 * | 1/1996 |
| WO | WO9623010 A2 | 8/1996 |
| WO | 9748736 | 12/1997 |
| WO | WO9842665 A1 | 10/1998 |
| WO | 9919335 | 4/1999 |

OTHER PUBLICATIONS

H. F. Mark, "Encyclopedia of Polymer Science and Engineering", vol. 7, 2nd edition, Jun. 1987, pp. 480–488.*
Ex parte Koster 136 USPQ 75, Dec. 1961.*

(List continued on next page.)

Primary Examiner—Mark L. Bell
Assistant Examiner—J. Pasterczyk
(74) Attorney, Agent, or Firm—Birch, Stewart, Kolasch & Birch, LLP

(57) ABSTRACT

The present invention provides an olefin polymerization catalyst by the use of which an olefin (co)polymer can be obtained with a high polymerization activity, and also provides a process for olefin polymerization using the catalyst. The olefin polymerization catalyst comprises a transition metal compound (A) represented by the formula (I):

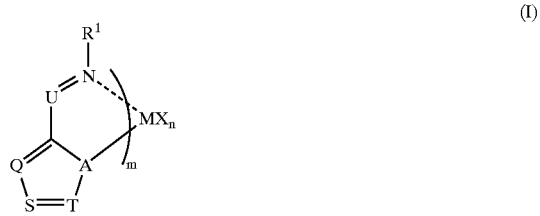

(I)

M: atom of Group 3 to Group 11
U: $R^2$—C, N, P
A: N, P
Q: $R^3$—C, N, P
S: $R^4$—C, N, P
T: $R^5$—C, N, P
m: 2–6
$R^1$–$R^5$: hydrogen, hydrocarbon group, silicon-containing group or the like (When M is an atom of Group 6, $R^1$ is not an aromatic hydrocarbon group.)
n: number satisfying a valence of M
X: halogen, hydrocarbon group or the like.

18 Claims, 1 Drawing Sheet

OTHER PUBLICATIONS

Gibson et al. "Chromium (III) complexes bearing N,N–chelate ligands as ethene polymerization catalysts" Chemical Communications, No. 16, pp 1651–1652, Aug. 1998.*

Male, Nigel A. H. et al., J. Chem. Soc., Dalton Trans., vol. 14, 1997, pp. 2487–2494.

Addison, Anthony M. et al., Inorg. Chim. Acta, vol. 147, 1988, pp. 61–64.

Banbery, Hilary J. et al., Polyhedron, vol. 9, No. 4, 1990, pp. 615–618.

Mayr, Andreas et al., Organometallics, vol. 6, No. 7, 1987, pp. 1503–1508.

El–Dissouky, Ali et al., Polyhedron, vol. 16, No. 7, 1997, pp. 1247–1253.

Sim, P. Greig et al., J. Am. Chem. Soc., Vol. 103, No. 1, 1981, pp. 241–243.

Martinez Lorente, Maria Angeles et al., Inorg. Chem., vol. 34, No. 21, 1995, pp. 5346–5357.

Schetty, G., Helv. Chim. Acta, vol. 51, No. 3, 1968, pp. 509–512.

Schetty, G., Helv. Chim. Acta, vol. 51, No. 3, 1968, pp. 505–509.

Kandil, Samir S. et al., Spectrosc. Lett., vol. 26, No. 3, 1993, pp. 535–550.

Yokoi, H. et al., Inorg. Chem., vol. 16, No. 6, 1977, pp. 1341–1349.

Garnovskii, A.D. et al., Zh. Obshch. Khim., vol. 41, No. 8, 1971, pp. 1829–1836. (Abstract).

Yeh, Kwan–Nan et al., Inorg. Chem., vol. 6, No. 4, 1967, pp. 830–833.

Mohamadou, Aminou et al., Inorg. Chim. Acta, vol. 169, No. 1, pp. 17–18. (1990).

Gibson et al., *Chem. Commun.*, (16) XP000877197, pp. 1651–1652 (1998).

Goyal et al., *Proc. Natl. Acad. Sci.*, India, Sect. A, vol. 62, No. 3, XP000892658, pp. 319–326 (1992).

Kanungo et al., *Indian J. Chem.*, Sect. A, vol. 15A, No. 12, XP 000900060, pp. 1104–1105 (1977).

Sharma et al, *Z. Phys. Chem.*, (LEIPZIG), vol. 262, No. 1, XP–000904796, pp. 97–100, (1981).

\* cited by examiner

Fig.1

(A) Transition metal component

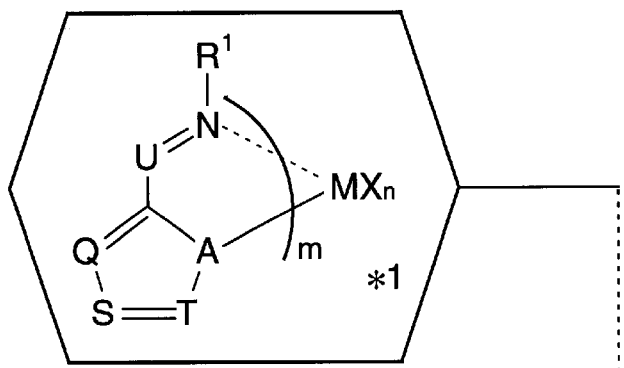

(B) Organometallic component

- Organometallic compound
- Organoaluminium oxy-compound
- Ionizing ionic compound (C) Third component (Carrier)

→ Olefin (co) Polymer

*1: M : atom of Group 3 ~ Group 11    U : $R^2$-C, N, P    A : N, P
Q : $R^3$-C, N, P    S : $R^4$-C, N, P
T : $R^5$-C, N, P    m : 2 ~ 6

$R^1$ ~ $R^5$ : hydrogen, hydrocarbon group, silicon-containing group or the like (when M is an atom of Group 6, $R^1$ is not an aromatic hydrocarbon group)

n : number satisfying a valence of M

X : hydrogen, hydrocarbon group or the like .

OLEFIN POLYMERIZATION CATALYST AND PROCESS FOR OLEFIN POLYMERIZATION

FIELD OF THE INVENTION

The present invention relates to an olefin polymerization catalyst and a process for olefin polymerization using the catalyst. More particularly, the invention relates to a novel olefin polymerization catalyst which has a high polymerization activity, and also relates to a process for olefin polymerization using the catalyst.

BACKGROUND OF THE INVENTION

"kaminsky catalysts" are well known as olefin polymerization catalysts. The Kaminsky catalysts exhibit extremely high polymerization activity, and by the use of them, polymers of narrow molecular weight distribution can be obtained. Transition metal compounds known as employable for the Kaminsky catalysts are, for example, bis(cyclopentadienyl)zirconium dichloride (see Japanese Patent Laid-Open Publication No. 19309/1983) and ethylenebis(4,5,6,7-tetrahydroindenyl)zirconium dichloride (see Japanese Patent Laid-Open Publication No. 130314/1986). It is also known that the olefin polymerization activity and the properties of the resulting polyolefins greatly vary when different transition metal compounds are used in the polymerization. Recently, transition metal compounds having a ligand of diimine structure have been proposed as novel olefin polymerization catalysts (see International Patent Publication No. 9623010).

By the way, polyolefins generally have excellent mechanical properties, so that they are used in many fields such as fields of various molded products. However, with the diversification of requirements for the properties of polyolefins, polyolefins of various properties have been desired in recent years. Moreover, increase of productivity has been also desired.

Under such circumstances as mentioned above, there has been desired development of olefin polymerization catalysts exhibiting excellent olefin polymerization activity and capable of producing polyolefins of excellent properties.

OBJECT OF THE INVENTION

It is an object of the invention to provide an olefin polymerization catalyst exhibiting an excellent olefin polymerization activity and a process for olefin polymerization using the catalyst.

SUMMARY OF THE INVENTION

The olefin polymerization catalyst according to the present invention comprises:

(A) a transition metal compound represented by the following formula (I):

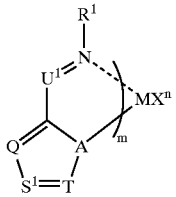

(I)

wherein M is a transition metal atom selected from Group 3 to Group 11 of the periodic table, $U^1$ is a carbon atom having a substituent group $R^2$, a nitrogen atom or a phosphorus atom, A is a nitrogen atom or a phosphorus atom, Q is a carbon atom having a substituent group $R^3$, a nitrogen atom or a phosphorus atom, $S^1$ is a carbon atom having a substituent group $R^4$, a nitrogen atom or a phosphorus atom, T is a carbon atom having a substituent group $R^5$, a nitrogen atom or a phosphorus atom, m is an integer of 2 to 6, $R^1$ to $R^5$ may be the same or different, when M is a transition metal atom selected from Group 3 to Group 5 and Group 7 to Group 11 of the periodic table, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, and when M is a transition metal atom selected from Group 6 of the periodic table, $R^1$ is a hydrogen atom, a halogen atom, an aliphatic hydrocarbon group, an alicyclic hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group and $R^2$ to $R^5$ are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of $R^1$ to $R^5$ may be bonded to each other to form a ring, and one group of $R^1$ to $R^5$ contained in one ligand and one group of $R^1$ to $R^5$ contained in another ligand may form a bridging group or a single bond, n is a number satisfying the valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups indicated by X may be the same or different to each other and plural groups indicated by X may be bonded to each other to form a ring.

The olefin polymerization catalyst according to the present invention comprises:

(A) Transition metal compound represented by the above formula (I), and (B) at least one compound selected from:
(B-1) an organometallic compound,
(B-2) an organoaluminum oxy-compound, and
(B-3) a compound which reacts with the transition metal compound (A) to form an ion pair.

The olefin polymerization catalyst according to the present invention may further comprise a carrier (C) in addition to the transition metal compound (A) and at least one compound (B) selected from the organometallic compound (B-1), the organoaluminum oxy-compound (B-2) and the compound (B-3) which reacts with the transition metal compound (A) to form an ion pair.

The process for olefin polymerization according to the present invention comprises polymerizing or copolymerizing an olefin in the presence of the above-mentioned olefin polymerization catalyst.

BRIEF DESCRIPTION OF THE DRAWING

FIG. 1 is an explanatory view showing steps for preparing the olefin polymerization catalyst according to the present invention.

DETAILED DESCRIPTION OF THE INVENTION

The olefin polymerization catalyst of the present invention and the process for olefin polymerization using this catalyst are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The olefin polymerization catalyst according to the invention is formed from:
(A) a transition metal compound represented by the formula (I) described below, and
(B) at least one compound selected from:
   (B-2) an organometallic compound,
   (B-2) an organoaluminum oxy-compound, and
   (B-3) a compound which reacts with the transition metal compound (A) to form an ion pair.

First, the catalyst components for forming the olefin polymerization catalyst of the invention are described.

(A) Transition of Metal Compound

The transition metal compound (A) for use in the invention is represented by the following formula (I).

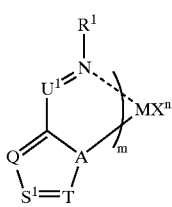

(I)

In the above formula, M is a transition metal atom selected from Group 3 (including lanthanoid) to Group 11 of the periodic table, preferably a transition metal atom selected from Group 3 (including lanthanoid) to Group 9, more preferably a transition metal atom selected from Group 3 to Group 5 and Group 9, particularly preferably a transition metal atom selected from Group 4 and Group 5. Examples of such metal atoms include scandium, titanium, zirconium, hafnium, vanadium, niobium, tantalum, cobalt, rhodium, yttrium, chromium, molybdenum, tungsten, manganese, rhenium, iron and ruthenium. Of these, preferable are scandium, titanium, zirconium, hafnium, vanadium, niobium, tantalum, cobalt, rhodium and the like. More preferable are titanium, zirconium, hafnium, cobalt, rhodium, vanadium, niobium, tantalum and the like. Particularly preferable are titanium, zirconium and hafnium.

N—M generally indicates a coordinate bond, but in the invention, it sometimes indicates no coordinate bond.

A is a nitrogen atom or a phosphorus atom, preferably a nitrogen atom.

A—M generally indicates a bond between A and the metal M, but in the invention, it may indicate that a pyrrole group (in the case where A is nitrogen) is η-bonded to the metal M.

$U^1$ is a carbon atom having a substituent group $R^2$ (—$(R^2)C$=), a nitrogen atom (—N=) or a phosphorus atom (—P=), preferably a carbon atom having a substituent group $R^2$ or a phosphorus atom, more preferably a carbon atom having a substituent group $R^2$.

Q is a carbon atom having a substituent group $R^3$ (—$(R^3)$C=), a nitrogen atom (—N=) or a phosphorus atom (—P=), preferably a carbon atom having a substituent group $R^3$.

$S^1$ is a carbon atom having a substituent group $R^4$ (—$(R^4)C$=), a nitrogen atom (—N=) or a phosphorus atom (—P=), preferably a carbon atom having a substituent group $R^4$.

T is a carbon atom having a substituent group $R^5$ (—$(R^2)$C=), a nitrogen atom (—N=) or a phosphorus atom (—P=), preferably a carbon atom having a substituent group $R^5$.

m is an integer of 2 to 6, preferably an integer of 2 to 4, more preferably 2.

$R^1$ to $R^5$ may be the same or different, when M is a transition metal atom selected from Group 3 to Group 5 and Group 7 to Group 11 of the periodic table, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, and when M is a transition metal atom selected from Group 6 of the periodic table, $R^1$ is a hydrogen atom, a halogen atom, an aliphatic hydrocarbon group, an alicyclic hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group and $R^2$ to $R^5$ are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group.

Examples of the hydrocarbon groups include:
aliphatic hydrocarbon groups, specifically, straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl, straight-chain or branched alkenyl groups of 2 to 30 carbon atoms, preferably 2 to 20 carbon atoms, such as vinyl, allyl and isopropenyl, and straight-chain or branched alkynyl groups of 2 to 30 carbon atoms, preferably 2 to 20 carbon atoms, such as ethynyl and propargyl;
alicyclic hydrocarbon groups, specifically, cyclic saturated hydrocarbon groups of 3 to 30 carbon atoms, preferably 3 to 20 carbon atoms, such as cyclopropyl, cyclobutyl, cyclopentyl, cyclohexyl and adamantyl, and cyclic unsaturated hydrocarbon groups of 5 to 30 carbon atoms, such as cyclopentadienyl, indenyl and fluorenyl; and aromatic hydrocarbon groups, specifically, aryl groups of 6 to 30 carbon atoms, preferably 6 to 20 carbon atoms, such as phenyl, benzyl, naphthyl, biphenylyl, terphenyl, phenanthryl and anthryl, and alkyl-substituted aryl groups, such as tolyl, isopropylphenyl, t-butylphenyl, dimethylphenyl and di-t-butylphenyl.

In the above hydrocarbon groups, a halogen atom may be substituted for the hydrogen atom. Examples of such hydrocarbon groups include halogenated hydrocarbon groups of 1 to 30 carbon atoms, preferably 1 to 20 carbon atoms, such as trifluoromethyl, pentafluorophenyl and chlorophenyl.

The above hydrocarbon groups may be substituted with other hydrocarbon groups. Examples of the thus substituted hydrocarbon groups include aryl-substituted alkyl groups, such as benzyl and cumyl.

Further, the above hydrocarbon groups may be substituted with heterocyclic compound residual groups; oxygen-containing groups, such as an alkoxy group, an aryloxy group, an ester group, an ether group, an acyl group, a carboxyl group, a carbonato group, a hydroxyl group, a peroxy group and a carboxylic anhydride group; nitrogen-containing groups, such as an amino group, an imino group, an amido group, an imido group, a hydrazino group, a hydrazono group, a nitro group, a nitroso group, a cyano group, an isocyano group, a cyanic ester group, an amidino group, a diazo group and an ammonium salt derived from an amino group; boron-containing groups, such as a boranediyl group, a boranetriyl group and a diboranyl group; sulfur-containing groups, such as a mercapto group, a thioester group, a dithioester group, an alkylthio group, an arylthio group, a thioacyl group, a thioether group, a thiocyanic ester group, an isothiocyanic ester group, a sulfonic ester group, a sulfonamido group, a thiocarboxyl group, a dithiocarboxyl group, a sulfo group, a sulfonyl group, a sulfinyl group, a sulfenyl group, a sulfonato group and a sulfinato group; phosphorus-containing groups, such as a phosphido group, a phosphoryl group, a thiophosphoryl group and a phosphato group; silicon-containing groups; germanium-containing groups; or tin-containing groups.

Thus, the hydrocarbon groups may be substituted with an oxygen-containing group, nitrogen-containing group, a boron-containing group, a sulfur-containing group, a phosphorus-containing group, a silicon-containing group, a germanium-containing group, a tin-containing group or the like, and in this case, the substituent group such as the oxygen-containing group is desirably a group whose characteristic atomic group is not directly bonded to N or the carbon atom of U, Q, S, T or A in the formula (I).

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30 carbon atoms, preferably 6 to 20 carbon atoms, such as phenyl, naphthyl, biphenylyl, terphenyl, phenanthryl and anthryl; and substituted aryl groups wherein the above aryl groups are substituted with 1 to 5 substituent groups such as halogen atoms, alkyl groups of 1 to 30 carbon atoms, preferably 1 to 20 carbon atoms, alkoxy groups of 1 to 30 carbon atoms, preferably 1 to 20 carbon atoms, aryl groups of 6 to 30 carbon atom, preferably 6 to 20 carbon atoms, and aryloxy groups of 6 to 30 carbon atoms, preferably 6 to 20 carbon atoms.

Two or more of $R^1$ to $R^5$ can be bonded to each other to form a ring. Examples of such rings include condensed rings, such as a benzene ring, a naphthalene ring, an acenaphthene ring and an indene ring; and groups wherein alkyl groups such as methyl, ethyl, propyl and butyl are substituted for the hydrogen atoms on these condensed rings.

The heterocyclic compound residual group is a cyclic group containing 1 to 5 hetero atoms therein, and the hetero atom is O, N, S, P or B. The cyclic ring is, for example, a monocyclic or polycyclic ring of 4 to 7 members, preferably a monocyclic or polycyclic ring of 5 to 6 members. Examples of such groups include residual groups of nitrogen-containing compounds such as pyrrole, pyridine, pyrimidine, quinoline and triazine; residual groups of oxygen-containing compounds such as furan and pyran; residual groups of sulfur-containing compounds such as thiophene; and groups wherein these residual groups are further substituted with substituent groups such as alkyl groups of 1 to 30 carbon atoms, preferably 1 to 20 carbon atoms, and alkoxy groups of 1 to 30 carbon atoms, preferably 1 to 20 carbon atoms.

The oxygen-containing group is a group containing 1 to 5 oxygen atoms therein. In the oxygen-containing group, the above-described heterocyclic compound residual group is not included, and a group containing a nitrogen atom, a sulfur atom, a phosphorus atom, a halogen atom or a silicon atom each of which is directly bonded to the oxygen atom is not included either. Examples of the oxygen-containing groups include an alkoxy group, an aryloxy group, an ester group, an ether group, an acyl group, a carboxyl group, a carbonato group, a hydroxyl group, a peroxy group and a carboxylic anhydride group. Preferable are an alkoxy group, an aryloxy group, an acetoxy group, a carbonyl group, a hydroxyl group and the like. When the oxygen-containing group contains carbon atom, the number of carbon atoms is desired to be in the range of 1 to 30, preferably 1 to 20.

The nitrogen-containing group is a group containing 1 to 5 nitrogen atoms therein, and the above-described heterocyclic compound residual group is not included. Examples of the nitrogen-containing groups include an amino group, an imino group, an amido group, an imido group, a hydrazino group, a hydrazono group, a nitro group, a nitroso group, a cyano group, an isocyano group, a cyanic ester group, an amidino group, a diazo group and an ammonium salt group derived from an amino group. Of these, preferable are an amino group, an imino group, an amido group, an imido group, a nitro group and a cyano group. When the nitrogen-containing group contains carbon atom, the number of carbon atoms is desired to be in the range of 1 to 30, preferably 1 to 20.

The sulfur-containing group is a group containing 1 to 5 sulfur atoms therein, and the above-described heterocyclic compound residual group is not included. Examples of the sulfur-containing groups include a mercapto group, a thioester group, a dithioester group, an alkylthio group, an arylthio group, a thioacyl group, a thioether group, a thiocyanic ester group, an isothiocyanic ester group, a sulfonic ester group, a sulfonamido group, a thiocarboxyl group, a dithiocarboxyl group, a sulfo group, a sulfonyl group, a sulfinyl group, a sulfenyl group, a sulfonato group and a sulfinato group. Of these, preferable are a sulfonato group, a sulfinato group, an alkylthio group and an arylthio group. When the sulfur-containing group contains carbon atom, the number of carbon atoms is desired to be in the range of 1 to 30, preferably 1 to 20.

The silicon-containing group is a group containing 1 to 5 silicon atoms therein, and examples thereof include a silyl group, such as a hydrocarbon-substituted silyl group, a siloxy group, such as a hydrocarbon-substituted siloxy group, or the like. Examples of the hydrocarbon-substituted silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl (pentafluorophenyl) silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. Examples of the hydrocarbon-substituted siloxy groups include trimethylsiloxy.

When the silicon-containing group contains carbon atom, the number of carbon atoms is desired to be in the range of 1 to 30, preferably 1 to 20.

The phosphorus-containing group is a group containing 1 to 5 phosphorus atoms therein, and the above-described heterocyclic compound residual group is not included. Examples of the phosphorus-containing groups include a phosphino group, a phosphoryl group, a thiophosphoryl group and a phosphono group.

The boron-containing group is a group containing 1 to 5 boron atoms therein, and the above-described heterocyclic compound residual group is not included. Examples of the boron-containing groups include a boranediyl group, a boranetriyl group and a diboranyl group. Preferable is a boryl group substituted with 1 to 2 hydrocarbon groups of 1 to 30 carbon atoms, preferably 1 to 20 carbon atoms, or a borate group substituted with 1 to 3 hydrocarbon groups of 1 to 30 carbon atoms, preferably 1 to 20 carbon atoms. When the boron-containing group is a group substituted with two or more hydrocarbon groups, the hydrocarbon groups may be the same or different.

Examples of the germanium-containing groups or the tin-containing groups include groups wherein silicon is replaced with germanium or tin in the above-mentioned silicon-containing groups.

The oxygen-containing group, nitrogen-containing group, sulfur-containing group, boron-containing group, aluminum-containing group and phosphorus-containing group mentioned above are each preferably a group whose characteristic atomic group is directly bonded to N or the carbon atom of U, Q, S, T or A in the formula (I).

The above examples of the groups indicated by $R^1$ to $R^5$ are more specifically described below.

Of the oxygen-containing groups, preferred examples of the alkoxy groups include methoxy, ethoxy, n-propoxy, isopropoxy, n-butoxy, isobutoxy and tert-butoxy; preferred examples of the aryloxy groups include phenoxy, 2,6-dimethylphenoxy and 2,4,6-trimethylphenoxy; preferred examples of the acyl groups include formyl, acetyl, benzoyl, p-chlorobenzoyl and p-methoxybenzoyl; and preferred examples of the ester groups include acetyloxy, benzoyloxy, methoxycarbonyl, phenoxycarbonyl and p-chlorophenoxycarbonyl.

Of the nitrogen-containing groups, preferred examples of the amido groups include acetamido, N-methylacetamido and N-methylbenzamido; preferred examples of the amino groups include alkylamino groups, such as methylamino, dimethylamino, diethylamino, dipropylamino, dibutylamino and dicyclohexylamino, and arylamino groups or alkylarylamino groups, such as phenylamino, diphenylamino, ditolylamino, dinaphthylamino and methylphenylamino; preferred examples of the imido groups include acetimido and benzimido; and preferred examples of the imino groups include methylimino, ethylimino, propylimino, butylimino and phenylimino.

Of the sulfur-containing groups, preferred examples of the alkylthio groups include methylthio and ethylthio; preferred examples of the arylthio groups include phenylthio, methylphenylthio and naphthylthio; preferred examples of the thioester groups include acetylthio, benzoylthio, methylthiocarbonyl and phenylthiocarbonyl; preferred examples of sulfonic ester groups include methylsulfonate, ethylsulfonate and phenylsulfonate esters; and preferred examples of the sulfonamido groups include phenylsulfonamido, N-methylsulfonamido and N-methyl-p-toluenesulfonamido.

Examples of the sulfonato groups include methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato. Examples of the sulfinato groups include methylsulfinato, phenylsulfinato, benzylsulfinato, p-toluenesulfinato, trimethylbenzenesulfinato and pentafluorobenzenesulfinato.

Of the phosphorus-containing groups, preferred examples of the phosphino groups include dimethylphosphino group, diphenylphosphino group or the like; preferred examples of the phosphoryl groups include methylphosphoryl group, isopropylphosphoryl group, phenylphosphoryl group or the like; preferred examples of the thiophosphoryl groups include methylthiophosphoryl group, isopropylthiophosphoryl group, phenylthiophosphoryl group or the like; preferred examples of the phosphono groups include phosphoric acid group, phosphate ester group, such as dimethyl phosphate, diisopropyl phosphate, diphenyl phosphate, or the like.

When M is a transition metal atom selected from Group 3 to Group 5 and Group 7 to Group 11 of the periodic table, $R^1$ to $R^5$ are each preferably a hydrogen atom, a halogen atom, a hydrocarbon group, a heterocyclic compound residual group, an oxygen-containing group, a nitrogen-containing group, a boron-containing group, a sulfur-containing group, a silicon-containing group, a germanium-containing group or a tin-containing group. When M is a transition metal atom selected from Group 6 of the periodic table, $R^1$ is preferably a hydrogen atom, a halogen atom, an aliphatic hydrocarbon group, an alicyclic hydrocarbon group, a heterocyclic compound residual group, an oxygen-containing group, a nitrogen-containing group, a boron-containing group, a sulfur-containing group, a silicon-containing group, a germanium-containing group or a tin-containing group, and $R^2$ to $R^5$ are each preferably a hydrogen atom, a halogen atom, a hydrocarbon group, a heterocyclic compound residual group, an oxygen-containing group, a nitrogen-containing group, a boron-containing group, a sulfur-containing group, a silicon-containing group, a germanium-containing group or a tin-containing group.

When M is a transition metal atom selected from Group 3 to Group 5 and Group 7 to Group 11 of the periodic table, $R^1$ to $R^5$ are each especially a hydrogen atom, a halogen atom, a hydrocarbon group, a heterocyclic compound residual group, an oxygen-containing group, a nitrogen-containing group, a sulfur-containing group or a silicon-containing group. When M is a transition metal atom selected from Group 6 of the periodic table, $R^1$ is especially a hydrogen atom, a halogen atom, an aliphatic hydrocarbon group, an alicyclic hydrocarbon group, a heterocyclic compound residual group, an oxygen-containing group, a nitrogen-containing group, a sulfur-containing group or a silicon-containing group, and $R^2$ to $R^5$ are each especially preferably a hydrogen atom, a halogen atom, a hydrocarbon group, a heterocyclic compound residual group, an oxygen-containing group, a nitrogen-containing group, a sulfur-containing group or a silicon-containing group.

In particular, as regards activity, $R^5$ is preferably a hydrogen atom, a halogen atom, a hydrocarbon group, a heterocyclic compound residual group, a hydrocarbon-substituted silyl group, a hydrocarbon-substituted siloxy group, an alkoxy group, an alkylthio group, an aryloxy group, arylthio group, an acyl group, an ester group, a thioester group, an amido group, an amino group, an imido group, an imino group, a sulfonic eater group, a sulfonamido group, a cyano group, a nitro group or a hydroxyl group, more preferably a hydrogen atom, a halogen atom, a hydrocarbon group or a hydrocarbon-substituted silyl group.

Preferred examples of the hydrocarbon groups indicated by $R^5$ include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atoms, such as phenyl, benzyl, naphthyl, biphenylyl and triphenylyl; and groups wherein the above groups are substituted with substituent groups such as an alkyl or alkoxy group of 1 to 30 carbon atoms, preferably 1 to 20 carbon atoms, a halogenated alkyl group of 1 to 30 carbon atoms, preferably 1 to 20 carbon atoms, an aryl or aryloxy group of 6 to 30 carbon atoms, preferably 6 to 20 carbon atoms, halogen, a cyano group, a nitro group and a hydroxyl group.

Preferred examples of the hydrocarbon-substituted silyl groups indicated by $R^5$ include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Particularly preferable are trimethylsilyl, triethylphenylsilyl, diphenylmethylsilyl, isophenylsilyl, dimethylphenylsilyl, dimethyl-t-butylsilyl and dimethyl(pentafluorophenyl)silyl.

Two or more groups of $R^1$ to $R^5$, preferably neighboring groups, may be bonded to each other to form an aliphatic ring, an aromatic ring or a hydrocarbon ring containing a hetero atom such as a nitrogen atom. These rings may further have a substituent group.

One group of $R^1$ to $R^5$ contained in one ligand and one group of $R^1$ to $R^5$ contained in another ligand may form a bonding group or a single bond, and $R^1$, $R^2$s, $R^3$s, $R^4$s, or $R^5$s may be the same or different.

n is a number satisfying a valence of M, specifically, an integer of 0 to 5, preferably an integer of 1 to 4, more preferably an integer of 1 to 3.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. When n is 2 or greater, plural groups indicated by X may be the same or different.

The halogen atom is fluorine, chlorine, bromine or iodine.

Examples of the hydrocarbon groups include the same groups as previously described with respect to $R^1$ to $R^5$. Specifically, there can be mentioned alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenylyl, naphthyl, methylnaphthyl, anthryl and phenanthryl. These hydrocarbon groups include halogenated hydrocarbon groups, specifically, groups wherein at least one hydrogen is replaced with halogen in the hydrocarbon groups of 1 to 20 carbon atoms.

Of the above groups, preferable are hydrocarbon groups of 1 to 20 carbon atoms.

Examples of the oxygen-containing groups include the same groups as previously described with respect to $R^1$ to $R^5$. Specifically, there can be mentioned a hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; an acetoxy group; and a carbonyl group.

Examples of the sulfur-containing groups include the same groups as previously described with respect to $R^1$ to $R^5$. Specifically, there can be mentioned sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups.

Examples of the nitrogen-containing groups include the same groups as previously described with respect to $R^1$ to $R^5$. Specifically, there can be mentioned an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the boron-containing groups include $BR_4$ (R is a hydrogen, an alkyl group, an aryl group which may have a substituent group, a halogen atom or the like).

Examples of the aluminum-containing groups include $AlR_4$ (R is a hydrogen, an alkyl group, an aryl group which may have a substituent group, a halogen atom or the like).

Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; a phosphonic acid group; and a phosphinic acid group.

Examples of the halogen-containing groups include fluorine-containing groups, such as $PF_6$ and $BF_4$; chlorine-containing groups, such as $ClO_4$ and $SbCl_6$; and iodine-containing groups, such as $IO_4$.

Examples of the heterocyclic compound residual groups include the same groups as previously described with respect to $R^1$ to $R^5$.

Examples of the silicon-containing groups include the same groups as previously described with respect to $R^1$ to $R^5$. Specifically, there can be mentioned hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl.

Examples of the germanium-containing groups include the same groups as previously described with respect to $R^1$ to $R^5$. Specifically, there can be mentioned groups wherein silicon is replaced with germanium in the above-mentioned silicon-containing groups.

Examples of the tin-containing groups include the same groups as previously described with respect to $R^1$ to $R^5$. Specifically, there can be mentioned groups wherein silicon is replaced with tin in the above-mentioned silicon-containing groups.

When n is 2 or greater, plural groups indicated by X may be the same or different, and plural groups indicated by X may be bonded to each other to form a ring.

X is preferably a hydrogen atom, a halogen atom, a hydrocarbon group, an oxygen-containing group or a nitrogen-containing group, more preferably a hydrogen atom, a halogen atom or a hydrocarbon group.

Examples of the transition metal compounds represented by the formula (I) are given below, but the transition metal compounds are not limited to those examples.

In the following examples, m is a transition metal atom, e.g., Sc(III), Ti(III), Ti(IV), Zr(III), Zr(IV), Hf(IV), V(IV), Nb(V), Ta(V), Co(II), Co(III), Rh(II), Rh(III) or Rh(IV). Of these, Ti(IV), Zr(IV) or Hf(IV) is particularly preferable.

X is halogen such an Cl or Br, or an alkyl group such as methyl. When plural X are present, they may be the same or different.

n is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

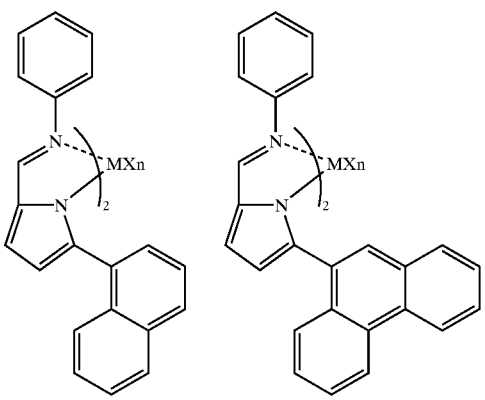

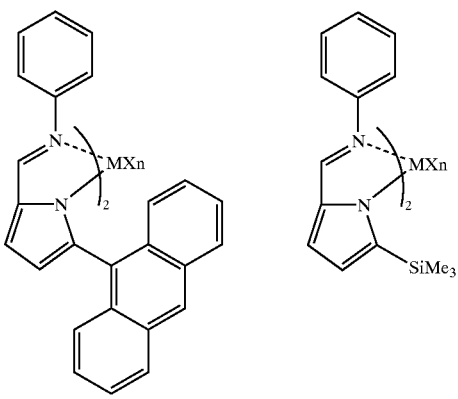

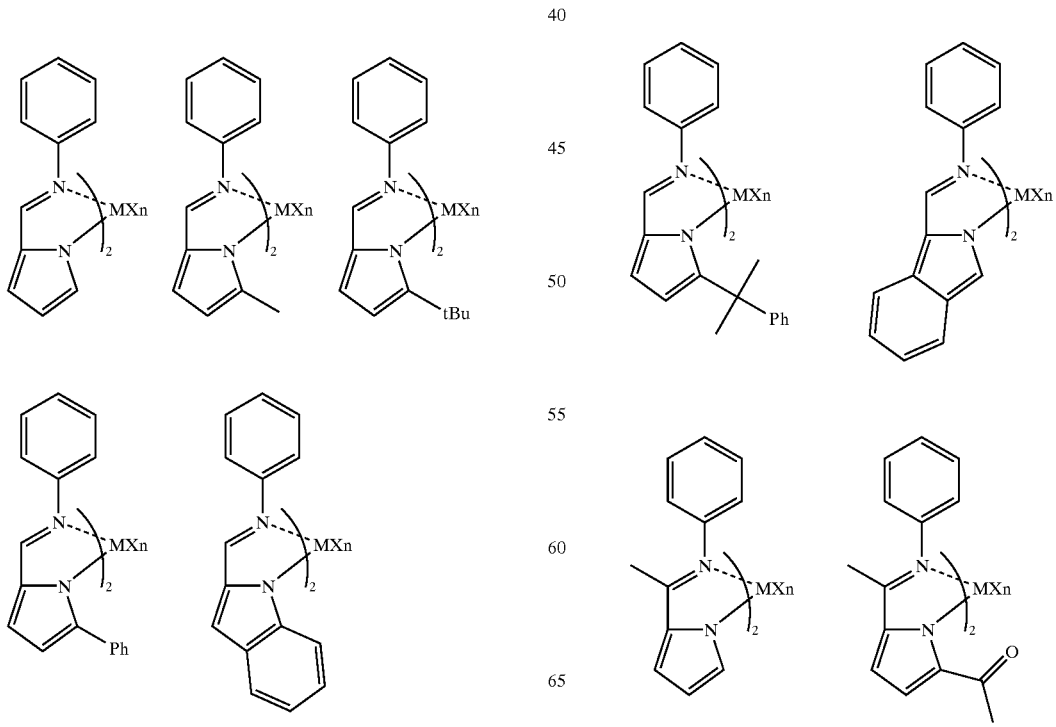

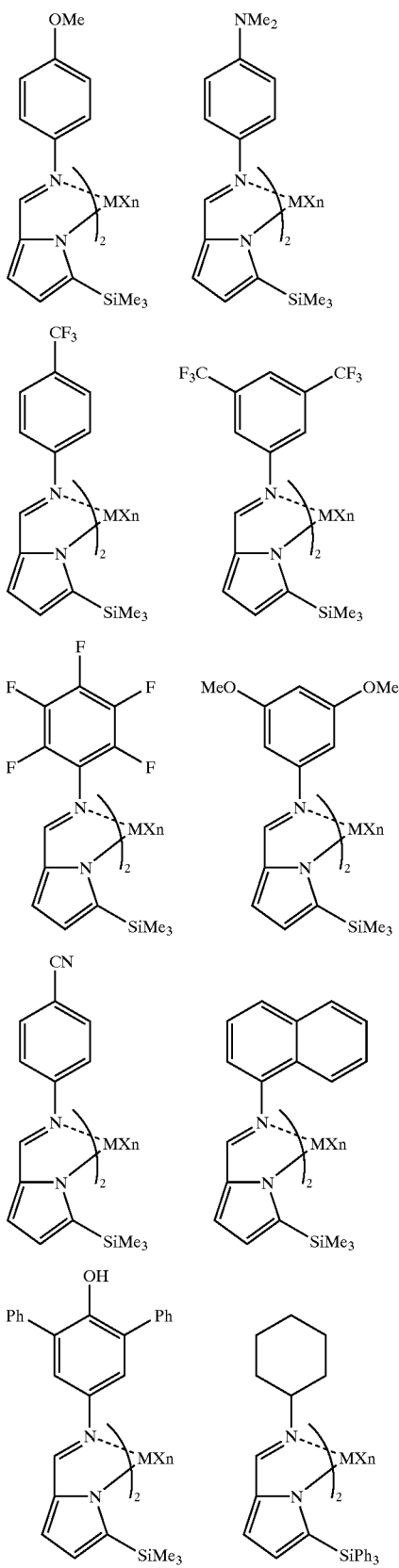
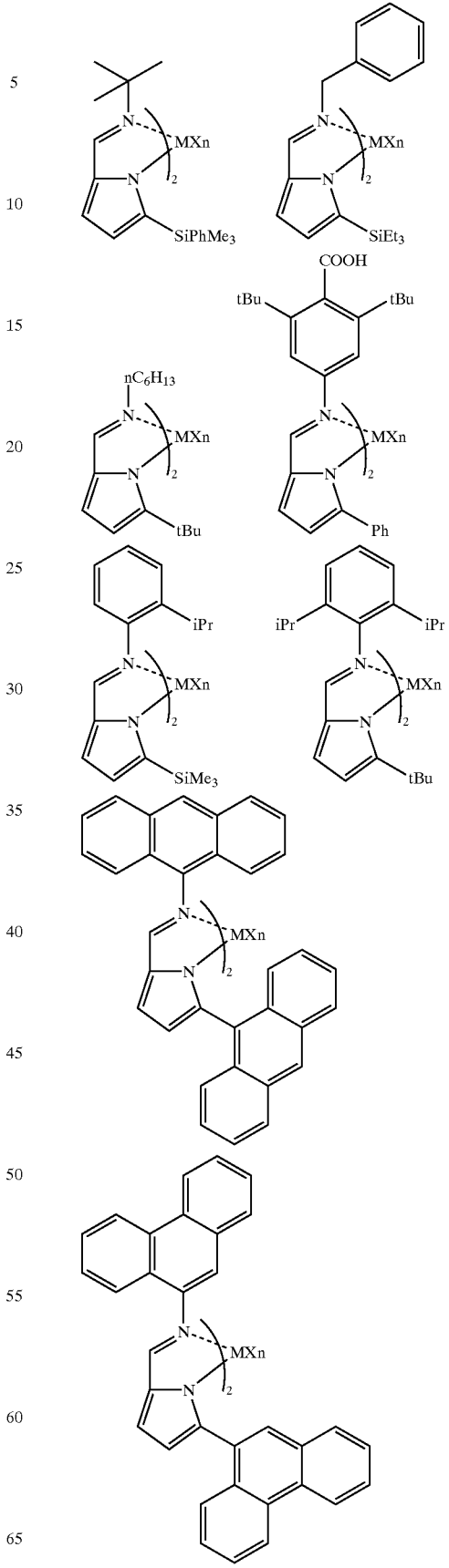

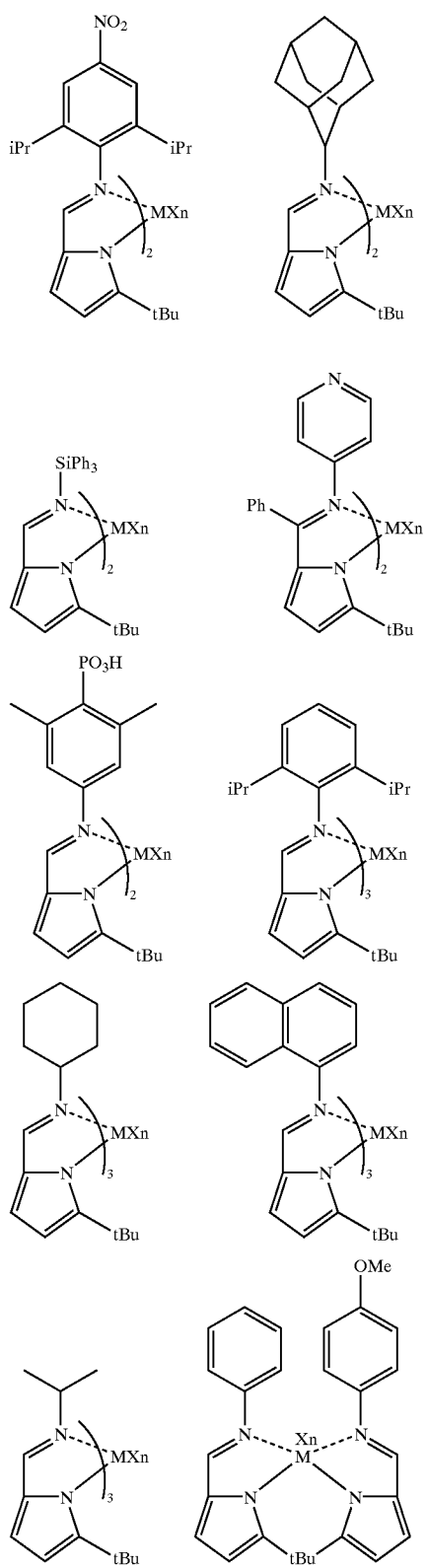
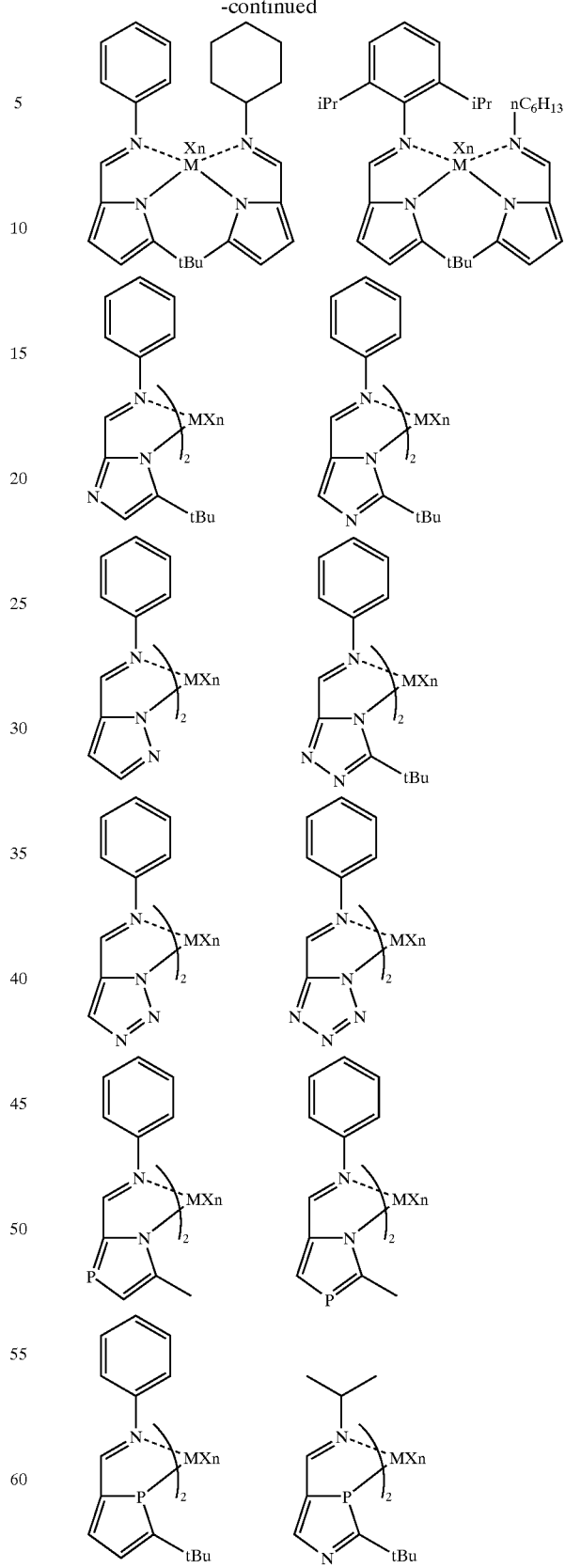

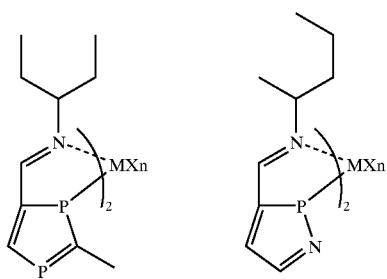
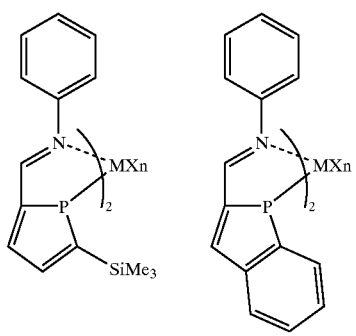
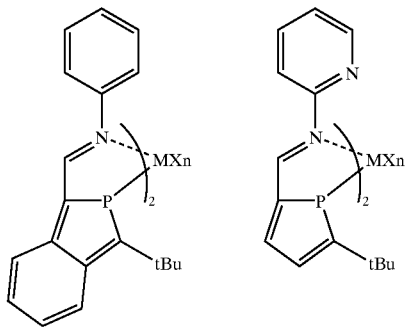
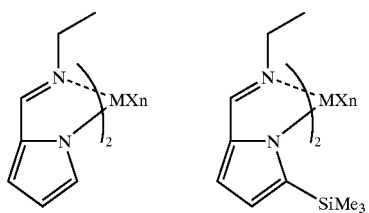
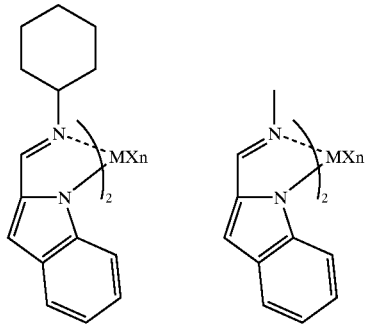
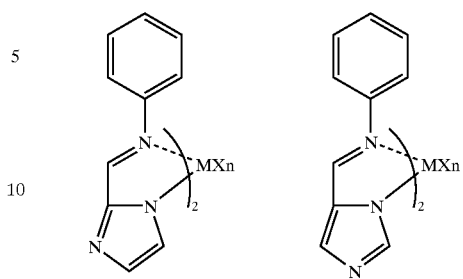
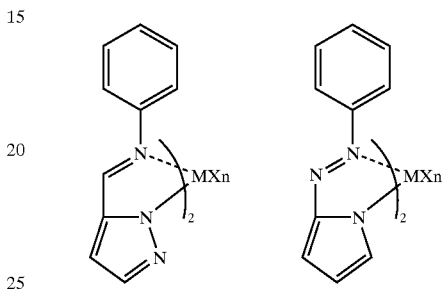
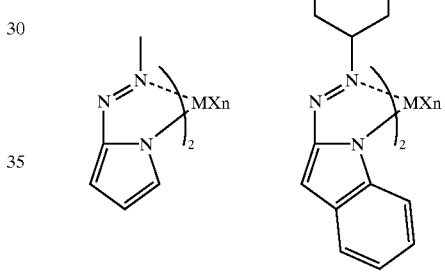
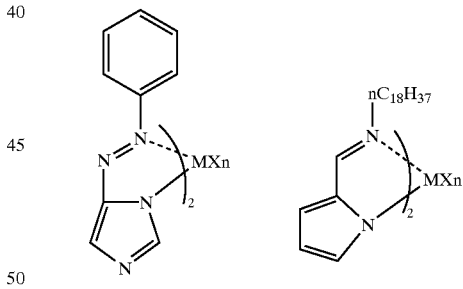
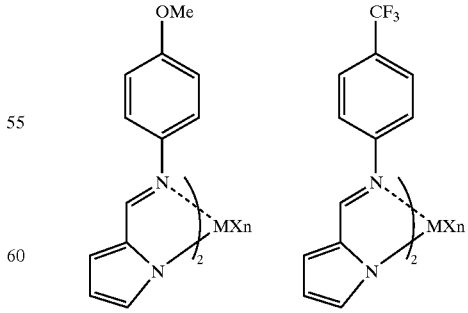

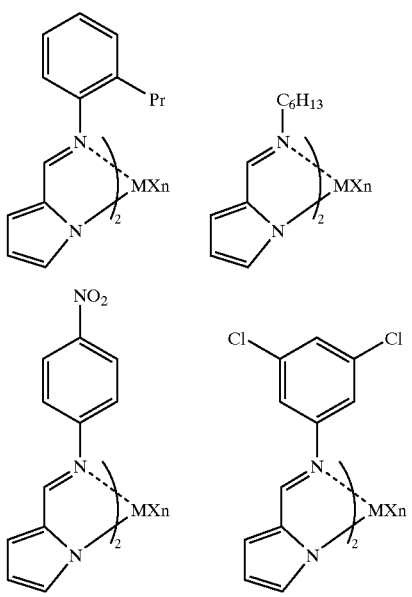
More specific examples of the transition metal compounds represented by the formula (I) include following titanium compounds and compounds wherein titanium is replaced with hafnium or zirconium in the following titanium compounds.
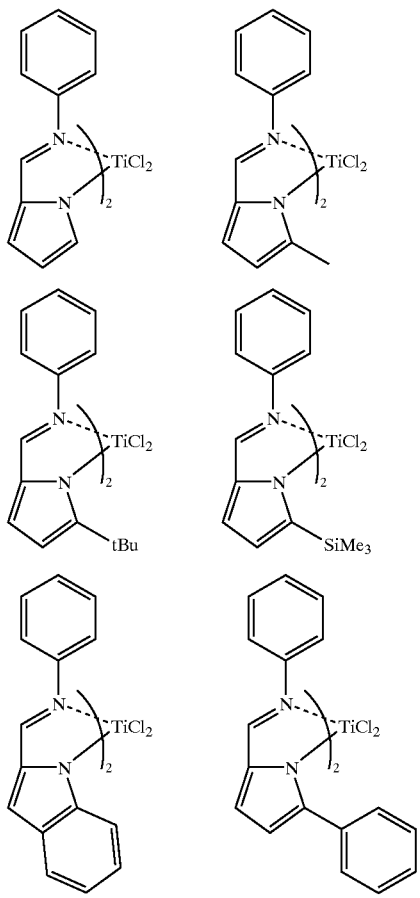
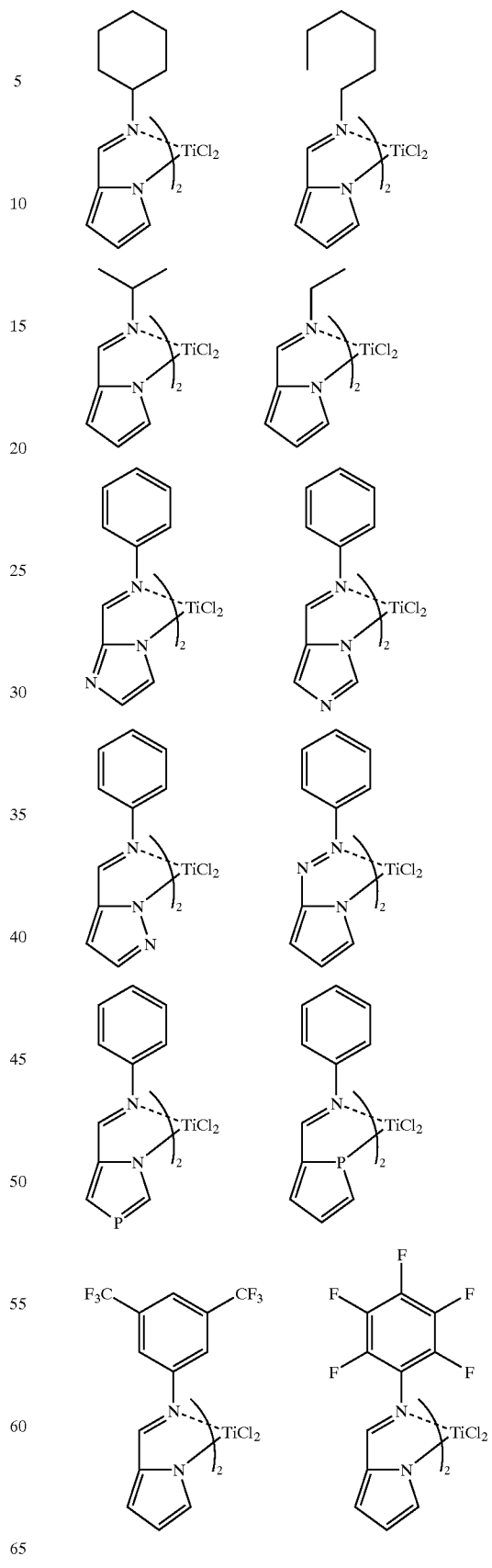

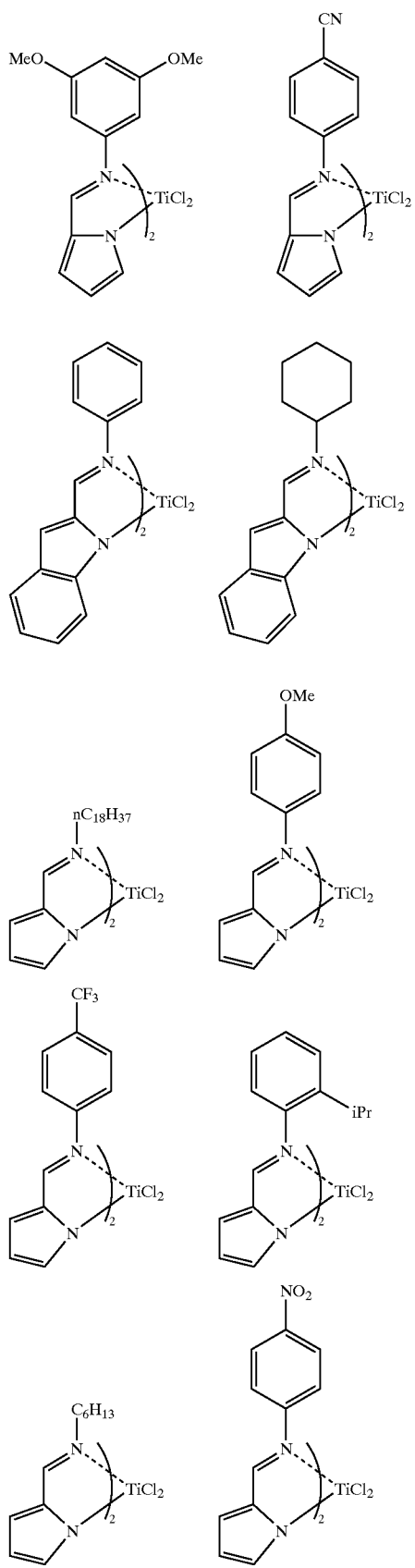
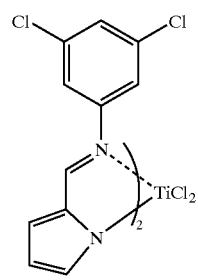
Examples of the compounds represented by the above formula (I) wherein M is a transition metal atom M of Group 6 of the periodic table are given below, but the compounds are not limited to those examples.
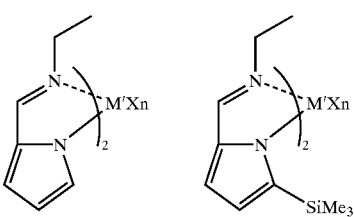
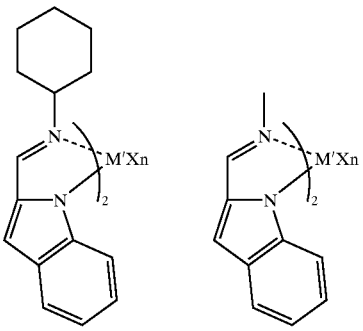
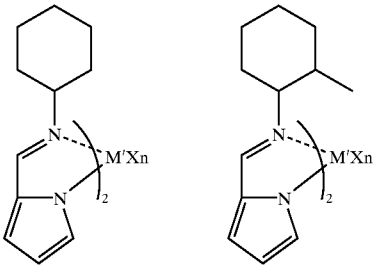
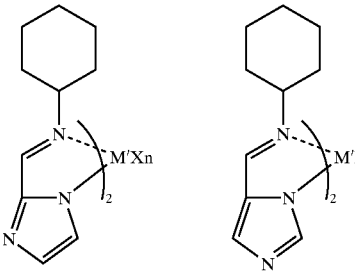

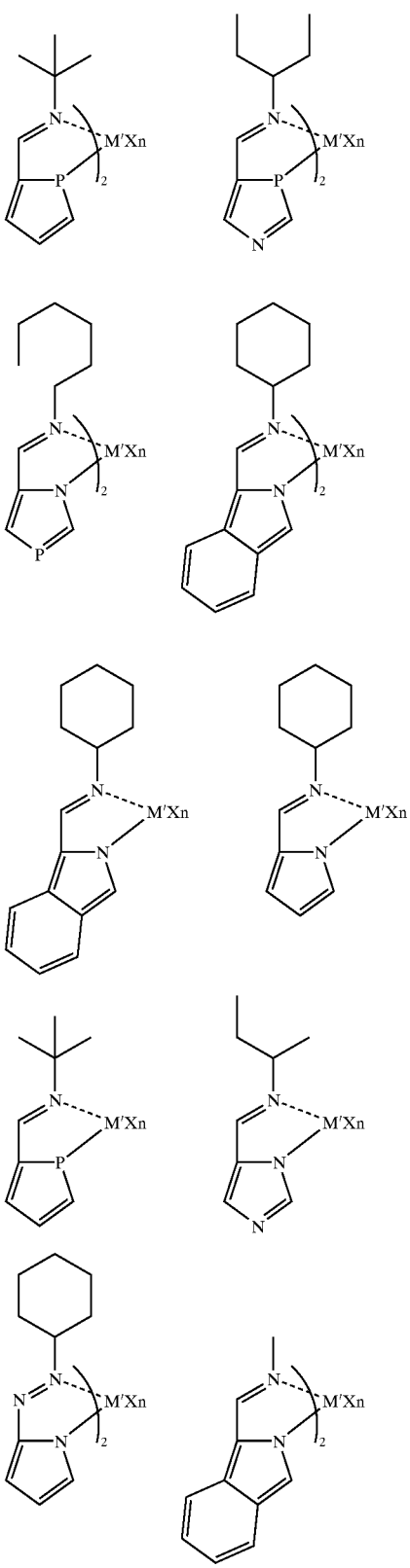
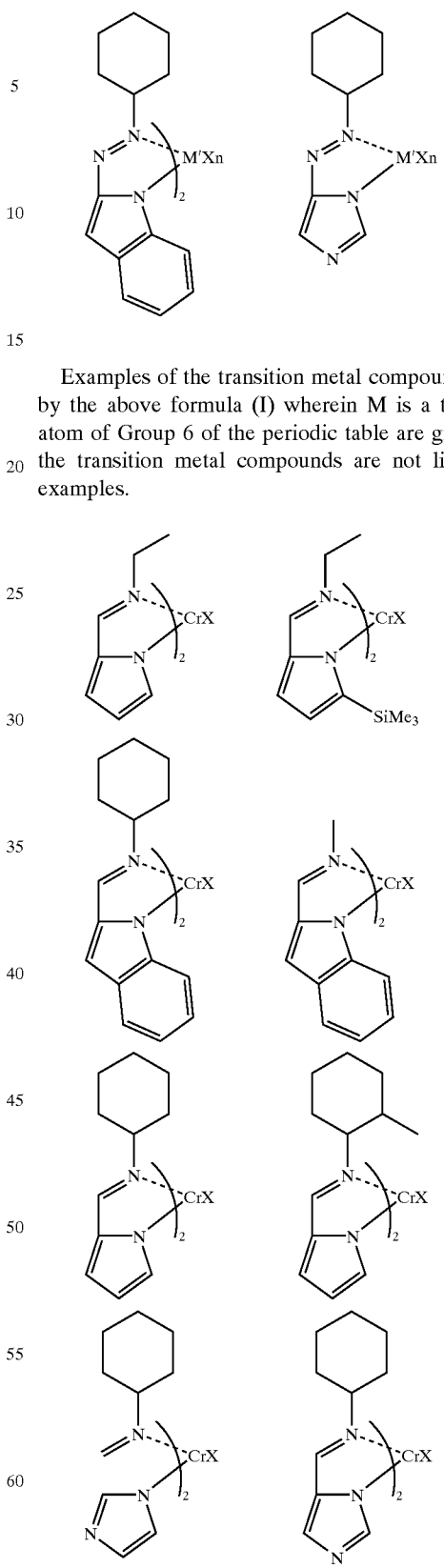
Examples of the transition metal compounds represented by the above formula (I) wherein M is a transition metal atom of Group 6 of the periodic table are given below, but the transition metal compounds are not limited to those examples.

-continued

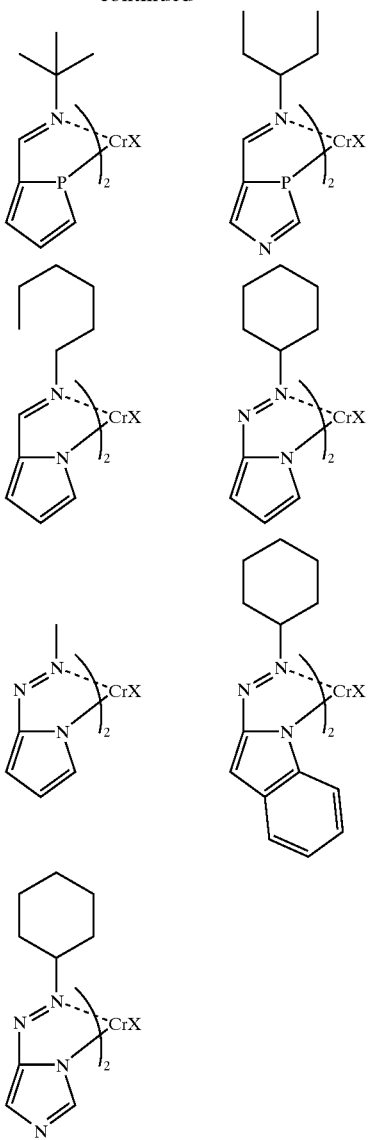

In the above examples, Me denotes a methyl group, Et denotes an ethyl group, iPr denotes an i-propyl group, tBu denotes a tert-butyl group, and Ph denotes a phenyl group.

The transition metal compound represented by the formula (I) wherein m is 2 and one group of $R^1$ to $R^5$ contained in one ligand and one group of $R^1$ to $R^5$ contained in another ligand form a bonding group or a single bond is, for example, a compound represented by the following formula (I-a).

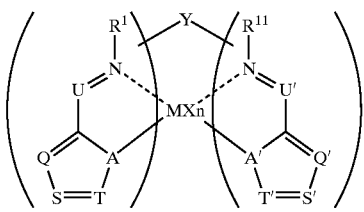
(I-a)

In the formula (I-a), M, A, Q, S, T, U, $R^1$ to $R^5$ and X have the same meanings as those of M, A, Q, S, T, U, $R^1$ to $R^5$ and X in the formula (I), and A' has the same meaning as that of A.

U' is a carbon atom having a substituent group $R^{12}$ (—($R^{12}$)C=), a nitrogen atom (—N=) or a phosphorus atom (—P=), preferably a carbon atom having a substituent group $R^{12}$ or a phosphorus atom, more preferably a carbon atom having a substituent group $R^{12}$.

Q' is a carbon atom having a substituent group $R^{13}$ (—($R^{13}$)C=), a nitrogen atom (—N=) or a phosphorus atom (—P=), preferably a carbon atom having a substituent group $R^{13}$.

S' is a carbon atom having a substituent group $R^{14}$ (—($R^{14}$)C=), a nitrogen atom (—N=) or a phosphorus atom (—P=), preferably a carbon atom having a substituent group $R^{14}$.

T' is a carbon atom having a substituent group $R^{15}$ (—($R^{15}$)C=), a nitrogen atom (—N=) or a phosphorus atom (—P=), preferably a carbon atom having a substituent group $R^{15}$.

$R^{11}$ to $R^{15}$ may be the same or different, $R^{11}$ has the same meaning as that of $R^1$, and $R^{12}$ to $R^{15}$ have the same meanings as those of $R^2$ to $R^5$.

$R^1$ to $R^5$ and $R^{11}$ to $R^{15}$ may be the same or different, and two or more groups of $R^1$ to $R^5$ and $R^{11}$ to $R^{15}$, preferably neighboring groups, may be bonded to each other to form an aliphatic ring, an aromatic ring or a hydrocarbon ring containing a hetero atom such as a nitrogen atom.

Y is a bonding group or a single bond formed from at least one group selected from $R^1$ to $R^5$ and at least one group selected from $R^{11}$ to $R^{15}$.

The bonding group indicated by Y is specifically a group containing at least one atom selected from oxygen, sulfur, carbon, nitrogen, phosphorus, silicon, selenium, tin, boron and the like. Examples of such groups include groups containing chalcogen atoms such as —O—, —S— and —Se—; nitrogen- or phosphorus-containing groups, such as —NH—, —N(CH$_3$)$_2$—, —PH— and —P(CH$_3$)$_2$—; hydrocarbon groups of 1 to 20 carbon atoms, such as —CH$_2$—, —CH$_2$—CH$_2$— and —C(CH$_3$)$_2$—; residual groups of cyclic unsaturated hydrocarbons of 6 to 20 carbon atoms, such as benzene, naphthalene and anthracene; residual groups of heterocyclic compounds having 3 to 20 carbon atoms and containing hetero atoms, such as pyridine, quinoline, thiophene and furan; silicon atom-containing groups, such as —SiH$_2$— and —Si(CH$_3$)$_2$—; tin atom-containing groups, such as —SnH$_2$— and —Sn(CH$_3$)$_2$—; and boron atom-containing groups, such as —BH—, —B(CH$_3$)— and —BF—.

The transition metal compound represented by the formula (I-a) wherein $R^1$ and $R^{11}$ form a bonding group or a single bond is, for example, a compound represented by the following formula (I-b).

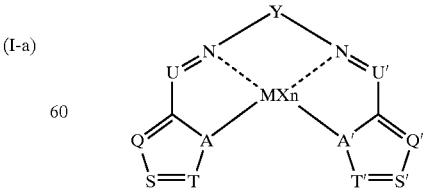
(I-b)

In the formula (I-b), M, A, Q, S, T, U, $R^2$ to $R^5$ and X have the same meanings as those of M, A, Q, S, T, U, $R^2$ to $R^5$ and X in the formula (I), and A', Q', S', T', U' and $R^{12}$ to $R^{15}$ have the same meanings as those of A', Q', S', T', U' and $R^{12}$ to $R^{15}$ in the formula (I-a).

$R^2$ to $R^5$ and $R^{12}$ to $R^{15}$ may be the same or different, and two or more groups of $R^2$ to $R^5$ and $R^{12}$ to $R^{15}$, preferably neighboring groups, may be bonded to each other to form an aliphatic ring, an aromatic ring or a hydrocarbon ring containing a hetero atom such as a nitrogen atom.

In the formula (I-b), at least one of $R^4$ and $R^{14}$, particularly both of them, are each preferably a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group.

n is a number satisfying a valence of M.

X is particularly preferably a halogen atom, a hydrocarbon group of 1 to 20 carbon atoms or a sulfonato group. When n is 2 or greater, the ring formed from two or more of X bonded to each other may be an aromatic ring or an aliphatic ring.

Y' has the same meaning as that of Y in the formula (I-a), and when Y is a hydrocarbon group, the hydrocarbon group has 3 or more carbon atoms. Such a bonding group Y' has a structure wherein the main chain is constituted of preferably 3 or more atoms, more preferably 4 to 20 atoms, particularly preferably 4 to 10 atoms. Such a bonding group may have a substituent group.

Examples of the divalent bonding groups (Y') include chalcogen atoms, such as —O—, —S— and —Se—; nitrogen- or phosphorus-containing groups, such as —NH—, —N(CH$_3$)—, —PH— and —P(CH$_3$)—; silicon-containing groups, such as —SiH$_2$— and —Si(CH$_3$)$_2$—; tin-containing groups, such as —SnH$_2$— and —Sn(CH$_3$)$_2$—, and boron-containing groups, such as —BH—, —B(CH$_3$)— and —BF—. Examples of the hydrocarbon groups include saturated hydrocarbon groups of 3 to 20 carbon atoms, such as —(CH$_2$)$_4$—, —(CH$_2$)$_5$— and —(CH$_2$)$_6$—; cyclic saturated hydrocarbon groups, such as s cyclohexylidene group and a cyclohexylene group; groups wherein parts of these saturated hydrocarbon groups are substituted with 1 to 10 substituent groups such as hydrocarbon groups, halogens (e.g., fluorine, chlorine, bromine) and hetero atoms (e.g., oxygen, sulfur, nitrogen, phosphorus, silicon, selenium, tin, boron); residual groups of cyclic unsaturated hydrocarbons of 6 to 20 carbon atoms, such as benzene, naphthalene and anthracene; and residual groups of heterocyclic compounds having 3 to 20 carbon atoms and containing hetero atoms, such as pyridine, quinoline, thiophene and furan.

Examples of the transition metal compounds represented by the formula (I-b) are given below, but the compounds of the formula (I-b) are not limited to those examples.

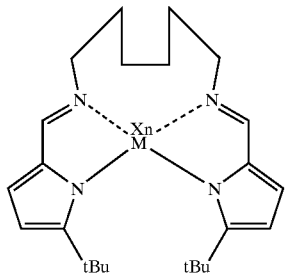

-continued

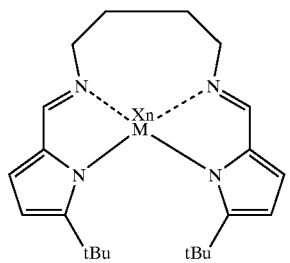

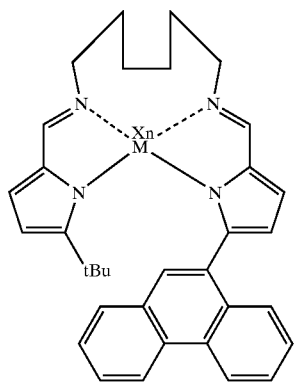

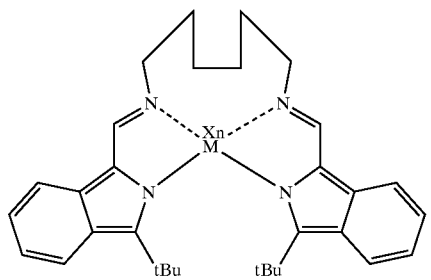

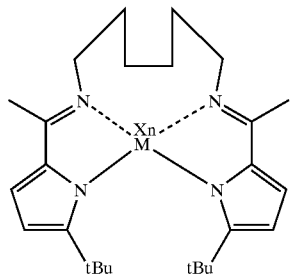

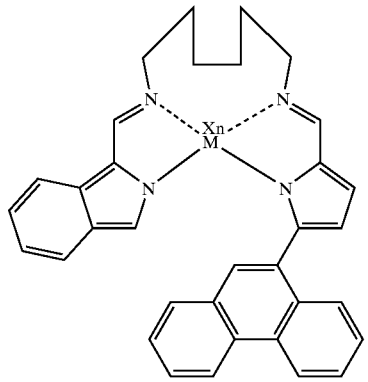

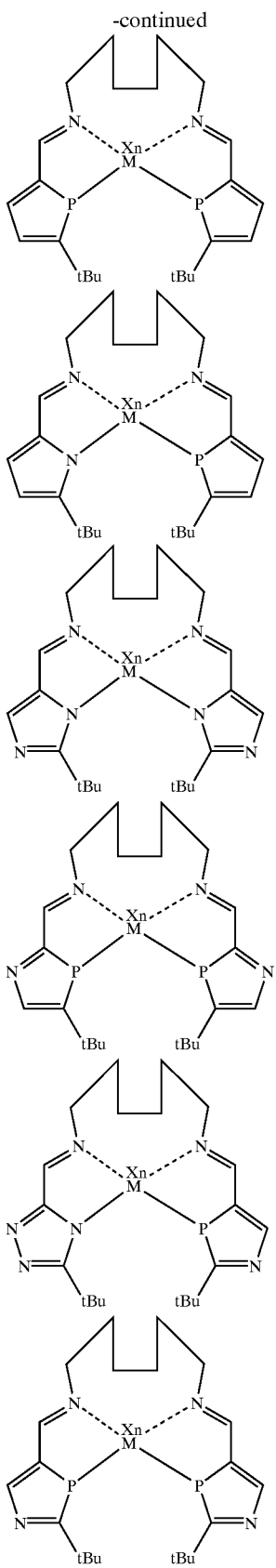

In the above examples, Me denotes a methyl group, and Ph denotes a phenyl group.

In the present invention, transition metal compounds wherein the titanium metal is replaced with a metal other than titanium, such as zirconium or hafnium, in the above-mentioned compounds are also employable.

The process for preparing the transition metal compound (A) is not specifically limited. For example, a compound (ligand precursor) which will become a ligand in the synthesized transition metal compound (A) is allowed to react with a transition metal-containing compound such as a compound represented by $MX_k$ (M and X have the same meanings as those of M and X in the formula (I) and k is a number satisfying a valence of M).

The process is now specifically described. When the ligand for constituting the transition metal compound (A) is a pyrrole-aldoimine ligand, a compound (ligand precursor) which will become the pyrrole-aldoimine ligand in the synthesized transition metal compound (A) is obtained by allowing an acylpyrrole compound to react with a primary amine compound represented by the formula $R^1$—$NH_2$ ($R^1$ has the same meaning as that of $R^1$ in the formula (I)) such as an aniline compound or an alkylamine compound. More specifically, the acylpyrrole compound and the primary amine compound are dissolved in a solvent. Then, the resulting solution is stirred under the conditions of a temperature of room temperature to reflux temperature for about 1 to 48 hours, whereby the corresponding ligand precursor is obtained in a high yield. As the solvent, any solvent generally used for such reaction is employable. Above all, an alcohol solvent such as methanol or ethanol or a hydrocarbon solvent such as toluene is preferable.

When the ligand for constituting the transition metal compound (A) is a phosphole aldoimine ligand, the ligand precursor can be obtained by, for example, allowing an acylphosphole compound obtained by formulation of halogenated phosphole (by a method described in Angew Chem 1994, 106(11), 1214) to react with an aniline compound or $R^1$—$NH_2$ ($R^1$ has the same meaning as that of $R^1$ in the formula (I)) in the same manner as described above.

Also, when the ligand is a five-membered heterocyclic compound wherein in the formula (I) U is a carbon atom, A is a nitrogen atom or a phosphorus atom, and at least one of Q, S and T is a nitrogen atom or a phosphorus atom, e.g., pyrazole aldoimine, the ligand precursor can be synthesized by performing α-formylation and introduction of an imino group in the same manner as described above.

In the synthesis of a ligand precursor wherein U in the formula (I) is a nitrogen atom, the ligand precursor can be obtained by allowing a five-membered heterocyclic compound having hydrogen at the α-position, such as pyrrole, indole, phosphole or pyrazole, to react with a diazonium compound synthesized from an aniline or alkylamine compound. More specifically, both of the starting compounds are dissolved in a solvent, and the resulting solution is stirred at a temperature of 0° C. to reflux temperature for about 1 to 48 hours, whereby the corresponding ligand is obtained. A water solvent is preferable as the solvent.

The diazonium compound is obtained by, for example, allowing a primary aniline or amine compound to react with sodium nitrite, alkyl nitrite or the like and a strong acid such as hydrochloric acid in water.

In the synthesis of the ligand precursor, an acid catalyst such as formic acid, acetic acid or toluenesulfonic acid may be used as the catalyst. It is effective for the progress of the reaction to use dehydrating agents such as molecular sieves, magnesium sulfate and sodium sulfate or to perform dehydration by the Dean and Stark method.

Then, the thus obtained ligand precursor is allowed to react with a transition metal-containing compound to synthesize the corresponding transition metal compound. More specifically, the synthesized ligand precursor is dissolved in a solvent and then allowed to directly react with the transition metal-containing compound, to synthesize the corresponding transition metal compound.

If necessary, the ligand precursor may be contacted with a base to prepare a salt, and the salt may be mixed with a metallic compound such as a metallic halide or a metallic alkylate at a low temperature and stirred at a temperature of −78° C. to room temperature or under reflux for about 1 to 48 hours.

As the solvent, any solvent generally used for such reaction is employable. Above all, a polar solvent such as ethyl ether or tetrahydrofuran (THF) or a hydrocarbon solvent such as toluene is preferably employed.

Examples of the bases used for preparing a salt include metallic salts such as lithium salts (e.g., n-butyllithium) and sodium salts (e.g., sodium hydride) and organic bases such as triethylamine and pyridine, although the bases employable are not limited thereto.

It is possible to exchange the metal M in the synthesized transition metal compound with another transition metal in a conventional way. When any of $R^1$ to $R^5$ is H, a substituent group other than H can be introduced in any stage of the synthesis process.

The transition metal compounds (A) mentioned above are used singly or in combination. The transition metal compound (A) can be used in combination with other transition metal compounds, e.g., known transition metal compounds constituted of ligands containing a hetero atom such as nitrogen, oxygen, sulfur, boron or phosphorus.

In addition to the transition metal compound (A), a titanium catalyst component containing magnesium, titanium and halogen as its essential ingredients is employable.

Other Transition Metal Compound

Examples of the transition metal compounds other than the above transition metal compounds (A) include the following transition metal compounds, without limiting to those examples.

(a-1) Transition metal imide compound represented by the following formula (I-c):

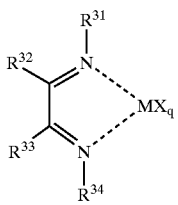

(I-c)

In the above formula, M is a transition metal atom selected from Group 8 to Group 10 of the periodic table, preferably nickel, palladium or platinum.

$R^{31}$ to $R^{34}$ may be the same or different and are each a hydrocarbon group of 1 to 50 carbon atoms, a halogenated hydrocarbon group of 1 to 50 carbon atoms, a hydrocarbon-substituted silyl group or a hydrocarbon group substituted with a substituent group containing at least one atom selected from nitrogen, oxygen, phosphorus, sulfur and silicon.

Two or more of the groups indicated by $R^{31}$ to $R^{34}$, preferably neighboring groups, may be boned to each other to form a ring.

q is an integer of 0 to 4.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When q is 2 or greater, plural groups indicated by X may be the same or different.

(a-2) Transition metal amide compound represented by the following formula (I-d):

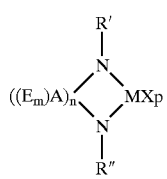

(I-d)

In the above formula, M is a transition metal atom selected from Group 3 to Group 6 of the periodic table, preferably titanium, zirconium or hafnium.

R' and R" may be the same or different and are each a hydrogen atom, a hydrocarbon group of 1 to 50 carbon atoms, a halogenated hydrocarbon group of 1 to 50 carbon atoms, a hydrocarbon-substituted silyl group or a substituent group having at least one atom selected from nitrogen, oxygen, phosphorus, sulfur and silicon.

m is an integer of 0 to 2.

n is an integer of 1 to 5.

A is an atom selected from Group 13 to Group 16 of the periodic table, specifically boron, carbon, nitrogen, oxygen, silicon, phosphorus, sulfur, germanium, selenium, tin or the like, preferably carbon or silicon. When n is 2 or greater, plural atoms indicated by A may be the same or different.

E is a substituent group having at least one atom selected from carbon, hydrogen, oxygen, halogen, nitrogen, sulfur, phosphorus, boron and silicon. When m is 2, two of E may be the same or different or may be bonded to each other to form a ring.

p is an integer of 0 to 4.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When p is 2 or greater, plural groups indicated by X may be the same or different. X is preferably a halogen atom, a hydrocarbon group of 1 to 20 carbon atoms or a sulfonato group.

(a-3) Transition metal diphenoxy compound represented by the following formula (I-e):

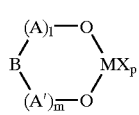

(I-e)

In the above formula, M is a transition metal atom selected from Group 3 to Group 11 of the periodic table.

l and m are each an integer of 0 or 1.

A and A' are each a hydrocarbon group of 1 to 50 carbon atoms, a halogenated hydrocarbon group of 1 to 50 carbon atoms, or a hydrocarbon group or a halogenated hydrocarbon group of 1 to 50 carbon atoms each having a substituent group containing oxygen, sulfur or silicon. A and A' may be the same or different.

B is a hydrocarbon group of 0 to 50 carbon atoms, a halogenated hydrocarbon group of 1 to 50 carbon atoms, a group represented by $R^1R^2Z$, oxygen or sulfur. $R^1$ and $R^2$ are each a hydrocarbon group having 1 to 20 carbon atoms or a hydrocarbon group having 1 to 20 carbon atoms and containing at least one hetero atom, and Z is carbon, nitrogen, sulfur, phosphorus or silicon.

is a number satisfying a valence of M.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When p is 2 or greater, plural groups indicated by X may be the same or different or may be bonded to each other to form a ring.

(a-4) Transition metal compound containing a ligand having cyclopentadienyl skeleton containing at least one hetero atom, said compound being represented by the following formula (I-f):

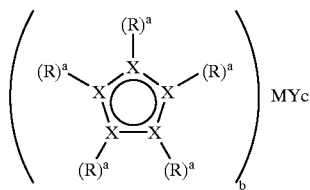

(I-f)

In the above formula, M is a transition metal atom selected from Group 3 to Group 11 of the periodic table.

X is an atom selected from Group 13, Group 14 and Group 15 of the periodic table, and at least one X is an atom other than carbon.

a is 0 or 1.

Each R may be the same or different and is a hydrogen atom, a halogen atom, a hydrocarbon group, a halogenated hydrocarbon group, a hydrocarbon-substituted silyl group or a hydrocarbon group having a substituent group containing at least one atom selected from nitrogen, oxygen, phosphorus, sulfur and silicon. Two or more of R may be bonded to each other to form a ring.

b is an integer of 1 to 4. When b is 2 or greater, groups indicated by $[((R)a)_5—X_5]$ may be the same or different, and Rs may be crosslinked to each other.

c is a number satisfying a valence of M.

Y is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group.

When c is 2 or greater, plural groups indicated by Y may be the same or different, and plural groups indicated by Y may be bonded to each other to form a ring.

(a-5) Transition metal compound represented by the following formula:

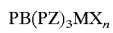 $PB(PZ)_3MX_n$

In the above formula, M is a transition metal atom of Group 3 to Group 11 of the periodic table.

R is a hydrogen atom, a hydrocarbon group of 1 to 20 carbon atoms or a halogenated hydrocarbon group of 1 to 20 carbon atoms.

Pz is a pyrazoyl group or a substituted pyrazoyl group.

n is a number satisfying a valence of M.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When n is 2 or greater, plural groups indicated by X may be the same or different or may be bonded to each other to form a ring.

(a-6) Transition metal compound represented by the following formula (I-g):

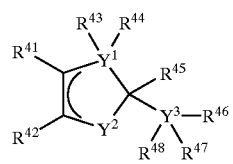

(I-g)

in the above formula, $Y^1$ and $Y^3$ may be the same or different and are each an atom selected from Group 15 of the periodic table, and $Y^2$ is an atom selected from Group 16 of the periodic table.

$R^{41}$ to $R^{48}$ may be the same or different, they are each a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and two or more of them may be bonded to each other to form a ring.

(a-7) Compound comprising a compound represented by the following formula (I-h) and a transition metal atom selected from Group 8 to Group 10 of the periodic table:

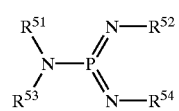

(I-h)

In the above formula, $R^{51}$ to $R^{54}$ may be the same or different, they are each a hydrogen atom, a halogen atom, a hydrocarbon group of 1 to 20 carbon atoms or a halogenated hydrocarbon group of 1 to 20 carbon atoms, and two or more of them may be bonded to each other to form a ring.

(a-8) Transition metal compound represented by the following formula (I-i):

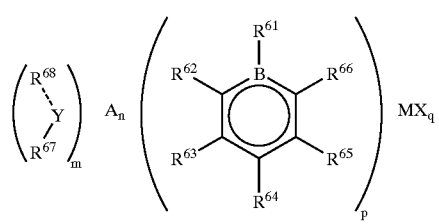

(I-i)

In the above formula, M is a transition metal atom selected from Group 3 to Group 11 of the periodic table.

m is an integer of 0 to 3.

n in an integer of 0 or 1.

p is an integer of 1 to 3.

q is a number satisfying a valence of M.

$R^{61}$ to $R^{68}$ may be the same or different, they are each a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group, and two or more of them may be bonded to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When q is 2 or greater, plural groups indicated by X may be the same or different or may be bonded to each other to form a ring.

Y is a group to crosslink a boratabenzene ring and is carbon, silicon or germanium.

A is an atom selected from Group 14, Group 15 and Group 16 of the periodic table.

(a-9) Transition metal compound represented by the following formula (I-j):

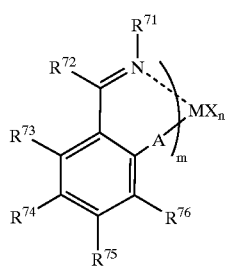

(I-j)

In the above formula, M is a transition metal atom selected from Group 3 to Group 11 of the periodic table.

m is an integer of 1 to 3.

A is an oxygen atom, a sulfur atom, a selenium atom or a nitrogen atom having a substituent group $R^{77}$.

$R^{71}$ to $R^{77}$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, when m is 2 or greater, one group of $R^{71}$ to $R^{77}$ contained in one ligand and one group of $R^{71}$ to $R^{77}$ contained in another ligand may be bonded to each other, and $R^{71}$s, $R^{72}$s, $R^{73}$s, $R^{74}$s, $R^{75}$s, $R^{76}$s or $R^{77}$s may be the same or different.

n is an integer satisfying a valence of M.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups indicated by X may be the same or different and plural groups indicated by X may be bonded to each other to form a ring.

(a-10) Transition metal compound containing a ligand having cyclopentadienyl skeleton (a-11) Vanadium compound represented by the following formula:

$$VO(OR)_nX_{3-n}$$

In the above formula, R is an aliphatic hydrocarbon residual group.

X is a halogen atom.

n is a number satisfying the condition of 0<n·3.

(B-1) Organometallic Compound

Examples of the organometallic compounds (B-1) for use in the invention include the below-described compounds which contain a metal selected from Group 1, Group 2, Group 12 and Group 13 of the periodic table.

(B-1a) Organoaluminum compound represented by the following formula:

$$R^a{}_mAl(OR^b)_nH_pX_q$$

wherein $R^a$ and $R^b$ may be the same or different and are each a hydrocarbon group of 1 to 15 carbon atoms, preferably 1 to 4 carbon atoms; X is a halogen atom; and m, n, p and q are numbers satisfying the conditions of 0<m·3, 0·n<3, 0·p<3, 0·q<3 and m+n+p+q=3.

(B-1b) Alkyl complex compound comprising a metal of Group 1 of the periodic table and aluminum, said compound being represented by the following formula:

$$M^2AlR^a{}_4$$

wherein $M^2$ is Li, Na or K; and $R^a$ is a hydrocarbon group of 1 to 15 carbon atoms, preferably 1 to 4 carbon atoms.

(B-1c) Dialkyl compound containing a metal of Group 2 or Group 12 of the periodic table, said compound being represented by the following formula:

$$R^aR^bM^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B-1a) include:

an organoaluminum compound represented by the following formula:

$$R^a{}_mAl(OR^b)_{3-m}$$

wherein $R^a$ and $R^b$ may be the same or different and are each a hydrocarbon group of 1 to 15 carbon atoms, preferably 1 to 4 carbon atoms, and m is preferably a number satisfying the condition of 1.5·m·3;

an organoaluminum compound represented by the following formula:

$$R^a{}_mAlX_{3-m}$$

wherein $R^a$ is a hydrocarbon group of 1 to 15 carbon atoms, preferably 1 to 4 carbon atoms, X is a halogen atom, and m is preferably a number satisfying the condition of 0<m<3;

an organoaluminum compound represented by the following formula:

$$R^a{}_mAlH_{3-m}$$

wherein $R^a$ is a hydrocarbon group of 1 to 15 carbon atoms, preferably 1 to 4 carbon atoms, and m is preferably a number satisfying the condition of 2·m<3;

and an organoaluminum compound represented by the following formula:

$$R^a{}_mAl(OR^b)_nX_q$$

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of 0<m·3, 0·n<3, 0·q<3 and m+n+q=3.

Particular examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylalumiwnum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisobutylaluminum hydride;

trialkenylaluminums represented by $(i\text{-}C_4H_9)_xAl_y(C_5H_{10})_z$ (wherein x, y and z are each a positive number, and z·2x), such as triisoprenylaluminum;

alkylaluminum alkoxides, such as isobutylaluminum memothoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition represented by $R^a{}_{2.5}Al(OR^b)_{0.5}$;

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylalumium(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as ethylaluminum dichloride, propylaluminum dichloride and butylaluminum dibromide;

dialkylaluminum hydrides, such as diethylaluminum hydride and dibutylaluminum hydride;

partially hydrogenated other alkylaluminums, specifically, alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Compounds analogous to the organoaluinum compound (B-1a) are also employable. For example, there can be mentioned organoaluminum compounds wherein two or more aluminum compounds are combined through a nitrogen atom, such as $(C_2H_5)_2AlN(C_2H_5)Al(C_2H_5)_2$.

Examples of the compounds (B-1b) include $LiAl(C_2H_5)_4$ and $LiAl(C_7H_{15})_4$.

Other compounds, such as methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium, are also employable as the organometallic compounds (B-1).

Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (B-1), the organoaluminum compounds are preferable.

The organometallic compounds (B-1) mentioned above are used singly or in combination of two or more kinds.

(B-2) Organoaluminum Oxy-compound

The organoaluminum oxy-compound (B-2) for use in the invention may be conventional aluminoxane or such a benzene-insoluble organoaluminum oxy-compound as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a comound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously described with respect to the organoaluminum compound (B-1a). Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, particularly chlorinated or brominated products thereof. Ethers such as ethyl ether and tetrahydrofuran are also employable. Of the solvents, particularly preferable are aromatic hydrocarbons and aliphatic hydrocarbons.

The benzene-insoluble organoaluminum oxy-compound for use in the invention is preferably an organoaluminum oxy-compound containing an Al component that is soluble in benzene at 60° C. in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound for use in the invention is, for example, an organoaluminum oxy-compound containing boron and represented by the following formula (IV):

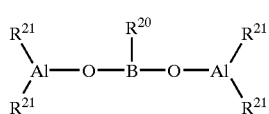

(IV)

wherein $R^{20}$ is a hydrocarbon group of 1 to 10 carbon atoms; and each $R^{21}$ may be the same or different and is a hydrogen atom, a halogen atom or a hydrocarbon group of 1 to 10 carbon atoms.

The organoaluminum oxy-compound containing boron and represented by the formula (IV) can be prepared by allowing an alkylboronic acid represented by the following formula (V) to react with an organoaluminum compound in an inert solvent at a temperature of −80° C. to room temperature for a period of 1 minute to 24 hours under an inert gas atmosphere, $$R^{20}-B-(OH)_2 \quad (V)$$

wherein $R^{20}$ is the same group as described above.

Examples of the alkylboronic acids represented by the formula (V) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluoroboronic acid, pentafluorophenylboronic acid and 3,5-bis(trifluoromethyl) phenylboronic acid. Of these, preferable are methylboronic acid, n-butylboronic acid, isobutylboronic acid, 3,5-difluorophenylboronic acid and pentafluorophenylboronic acid. These alkylboronic acids are used singly or in combination of two or more kinds.

Examples of the organoaluminum compounds to be reacted with the alkylboronic acid include the same organoaluminum compounds as previously described with respect to the organoaluminum compound (B-1a). Of these, preferable are trialkylaluminums and tricycloalkylaluminums. Particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(B-3) Compound Which Reacts With the Transition Metal Compound to Form Ion Pair

Examples of the compound (B-3) which reacts with the transition metal compound (A) to form an ion pair (referred to as "ionizing ionic compound" hereinafter) include Lewis acid, an ionic compound, a borane compound and a carborane compound described in Japanese Patent Laid-Open Publications No. 501950/1989, No. 502036/1989, No. 179005/1991, No. 179006/1991, No. 207703/1991 and No. 207704/1991, and U.S. Pat. No. 5,321,106. A heteropoly compound and an isopoly compound are also available.

The Lewis acid is, for example, a compound represented by $BR_3$ (R is fluorine or a phenyl group which may have a substituent group such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris (o-tolyl)boron and tris(3,5-dimethylphenyl)boron.

The ionic compound is, for example, a compound represented by the following formula (VI).

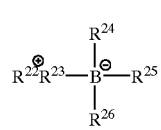

(VI)

In the above formula, $R^{22}$ is $H^+$, carbonium cation, oxonium cation, ammonium cation, phosphonium cation, cycloheptyltrienyl cation, ferrocenium cation having a transition metal, or the like.

$R^{23}$ to $R^{26}$ may be the same or different and are each an organic group, preferably an aryl group or a substituted aryl group.

Examples of the carbonium cations include tri-substituted carbonium cations, such as triphenylcarbonium cation, tri (methylphenyl)carbonium cation and tri(dimethylphenyl) carbonium cation.

Examples of the ammonium cations include trialkylammonium cations, such as trimethylamonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri (dimethylphenyl)phosphonium cation.

$R^{22}$ is preferably carbonium cation, ammonium cation or the like, particularly preferably triphenylcarbonium cation, N,N-dimethylanilinium cation or N,N-diethylanilinium cation.

Also employable as the ionic compound is a trialkyl-substituted ammonium salt, a N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl) ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compound is triphenylcarbeniuntetrakis(pentafluorophenyl)borate, N,N-dimethylaniliniumtetrakis(pentafluorophenyl)borate, forroceniumtetra(pentafluorophenyl)borate, triphenylcarbeniumpentaphenylcyclopentadienyl complex, N,N-diethylaniliniumpentaphenylcyclopentadienyl complex or a boron compound represented by the following formula (VII) or (VIII).

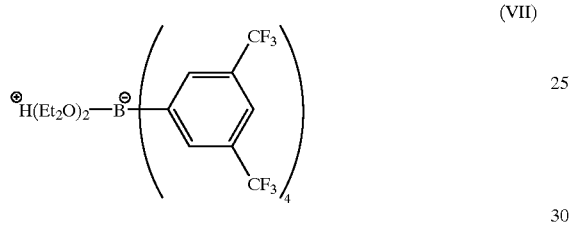

(VII)

wherein Et is an ethyl group.

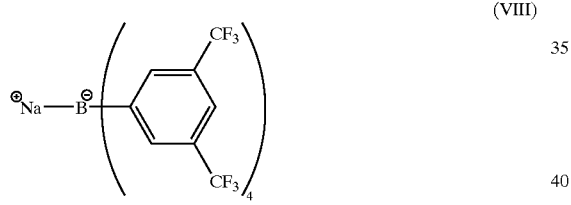

(VIII)

Examples of the borane compounds include:
decaborane(14);
salts of anions, such as bis(tri(n-butyl)ammonium) nonaborate, bis(tri(n-butyl)ammonium)decaborate, bis(tri(n-butyl)ammonium)undecaborate, bis(tri(n-butyl)ammonium)dodecaborate, bis(tri(n-butyl)ammonium)decachlorodecaborate and bis(tri(n-butyl)ammonium)dodecachlorododecaborate; and
salts of metallic borane anions, such as tri(n-butyl)ammoniumbis(dodecahydridododecaborate)cobaltate(III) and bis(tri(n-butyl)ammonium)bis-(dodecahydridododecaborate)nickelate(III).
Examples of the carborane compounds include:
salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecabydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and salts of metallic carborane anions, such as tri(n-butyl)ammoniumbis(nonahydrido-1,3-dicarbanonaborate)cobaltate(III), tri(n-butyl)ammoniumbis(undecahydrido-7,8-dicarbaundecaborate)ferrate(III), tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate(III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tris(tri(n-butyl)ammonium)bis(undecahydrido-7-carbaundecaborate)chromate(III), bis(tri(n-butyl)ammonium)bis(undecahydrido-7-carbaundecaborate)manganate(IV), bis(tri(n-butyl)ammonium)bis(undecahydrido-7-carbaundecaborate)cobaltate(III) and bis(tri(n-butyl)ammonium)bis(undecahydrido-7-carbaundecaborate)nickelate(IV).

The heteropoly compound comprises an atom selected from silicon, phosphorus, titanium, germanium, arsenic and tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid and salts of these acids, for example, the salt of these acids and metals of Group 1 or Group 2 of the periodic table (e.g., lithium, sodium, potassium, rubidium, cesium, beryllium, magnesium, calcium, strontium, barium), and organic salts such as salts of these acids and triphenylethyl salt.

The ionizing ionic compounds (B-3) mentioned above are used singly or in combination of two or more kinds.

If the organoaluminum oxy-compound (B-2) such as methylaluminoxane is used as a cocatalyst component, the transition metal compound catalyst according to the invention exhibits an extremely high copolymerization with an excellent activity against olefin compounds. If the ionizing ionic compound (B-3) such as triphenylcarboniumtetrakis (pentafluorophenyl)borate is used as a cocatalyst component, an olefin polymer having an extremely high molecular weight can be obtained with excellent activity.

In the olefin polymerization catalyst according to the invention, the below-described carrier (C) can be used, if necessary, in addition to the transition metal compound (A) and at least one compound (B) selected from the organometallic compound (B-1), the organoaluminum oxy-compound (B-2) and the ionizing ionic compound (B-3).

(C) Carrier

The carrier (C) for use in the invention is an inorganic or organic compound in the form of granular or particulate solid.

As the inorganic compound, porous oxide, inorganic halogenide, clay, clay mineral or an ion-exchange layered compound is preferable.

Examples of the porous oxides include $SiO_2$, $Al_2O_3$, MgO, ZrO, $TiO_2$, $B_2O_3$, CaO, ZnO, BaO, $ThO_2$, and complex compounds or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are compounds containing $SiO_2$ and/or $Al_2O_3$ as their major component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the porous oxides differ in their properties depending upon the type and the preparation process thereof, the carrier preferably used in the invention has a particle diameter of 10 to 300 μm, preferably 20 to 200 μm, a specific surface area of 50 to 1000 $m^2/g$, preferably 100 to 700 $m^2/g$, and a pore volume of 0.3 to 3.0 $cm^3/g$. If necessary, the carrier is calcined at 100 to 1000° C., preferably 150 to 700° C., prior to use.

Examples of the inorganic halogenides employable in the invention include $MgCl_2$, $MgBr_2$, $MnCl_2$ and $MnBr_2$. The inorganic halogenide may be used as it is, or may be used after pulverized by a ball mill or an oscillating mill. The inorganic halogenide may be used as fine particles of a precipitate obtained by dissolving the inorganic halogenide in a solvent such as alcohol and then conducting precipitation using a precipitant.

The clay employable in the invention is generally mainly composed of clay mineral. The ion-exchange layered compound employable in the invention is a compound having a crystal structure wherein plural layers are laminated in parallel to one another with a weak bond strength by ionic bonding or the like, and the ions contained in the compound are exchangeable. Most of clay minerals are ion-exchange layered compounds. The clay, the clay minerals and the ion-exchange layered compounds employable in the invention are not limited to natural ones but include synthetic ones.

Example of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acid salts of polyvalent metals, such as α-$Zr(HAsO_4)_2$.$H_2O$, α-$Zr(HPO_4)_2$, α-$Zr(KPO_4)_2$.$3H_2O$, α-$Ti(HPO_4)_2$, α-$Ti(HAsO_4)_2$.$H_2O$, α-$Sn(HPO_4)_2$.$H_2O$, γ-$Zr(HPO_4)_2$, γ-$Ti(HPO_4)_2$ and γ-$Ti(NH_4PO_4)_2$.$H_2O$.

The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to $3 \times 10^4$ Å by a mercury penetration method using a mercury porosimeter.

If a compound having a pore volume, as measured on pores having a radius of not less than 20 Å, of less than 0.1 cc/g is used as the carrier, it tends to be difficult to obtain high polymerization activity.

It is preferable that the clay and the clay minerals for use in the invention are subjected to chemical treatments. Any of surface treatments to remove impurities attached to the surface and treatments having an influence on the crystal structure of the clay are employable. Examples of such chemical treatments include acid treatment, alkali treatment, salt treatment and organic substance treatment. The acid treatment contributes to not only removing impurities from the surface but also eluting cations such as Al, Fe and Mg present in the crystal structure to increase the surface area. The alkali treatment destroys crystal structure of clay to bring about change in the structure of the clay. The salt treatment and the organic substance treatment can produce ionic complex, molecular complex, organic derivative or the like to change the surface area or the distance between layers.

The ion-exchange layered compound for use in the invention may be a layered compound in which the exchangeable ions between layers have been exchanged with other large and bulky ions utilizing ion exchange properties to enlarge the distance between the layers. The bulky ion plays a pillar-like roll to support the layer structure and is generally called a "pillar". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $(Al_{31}O_4(OH)_{24})^{7+}$, $(Zr_4(OH)_{14})^{2+}$ and $(Fe_3O(OCOCH_3)_6)^+$. These compounds are used singly or in combination of two or more kinds. The intercalation of the compounds may be carried out in the presence of polymers obtained by hydrolysis of metallic alkoxides such as $Si(OR)_4$, $Al(OR)_3$ and $Ge(OR)_4$ (R is a hydrocarbon group or the like) or in the presence of colloidal inorganic compounds such as $SiO_2$. Examples of the pillars include oxides produced by intercalation of the above-mentioned metallic hydroxide ions between layers, followed by dehydration under heating.

The clay, clay minerals and ion-exchange layered compounds mentioned above may be used as they are, or may be used after they are subjected to a treatment of ball milling, sieving or the like. Moreover, they may be used after they are subjected to water adsorption or dehydration under heating. The clay, clay minerals and ion-exchange layered compounds may be used singly or in combination of two or more kinds. Of the above-mentioned materials, preferable are clay and clay minerals, and particularly preferable are montmorillonite, vermiculite, pectolite, taeniolite and synthetic mica.

The organic compound is, for example, a granular or particulate solid compound having a particle diameter of 10 to 300 μm. Examples of such compounds include (co) polymers produced using an α-olefin of 2 to 14 carbon atoms such as ethylene, propylene, 1-butene or 4-methyl-1-pentene as a chief ingredient, (co)polymers produced using vinylcyclohexane or styrene as a chief ingredient, and modified products thereof.

The olefin polymerization catalyst of the invention may further comprise the below-described specific organic compound component (D), if necessary, in addition to the transition metal compound (A), at least one compound (B) selected from the organometallic compound (B-1), the organoaluminum oxy-compound (B-2) and the ionizing ionic compound (B-3), and the optionally used carrier (C).

(D) Organic Compound Component

In the present invention, the organic compound component (D) is optionally used for the purpose of improving polymerizability and properties of the resulting polymer. Examples of the organic compounds include alcohols, phenolic compounds, carboxylic acids, phosphorus compounds and sulfonates.

As the alcohols and the phenolic compounds, those represented by $R^{31}$—OH ($R^{31}$ is a hydrocarbon group of 1 to 50 carbon atoms or a halogenated hydrocarbon group of 1 to 50 carbon atoms) are generally employed.

The alcohols are preferably those of the above formula wherein $R^{31}$ is a halogenated hydrocarbon group. The phenolic compounds are preferably those wherein the α,α'-positions of the hydroxyl group are substituted with hydrocarbon groups of 1 to 20 carbon atoms.

As the carboxylic acids, those represented by $R^{32}$—COOH ($R^{32}$ is a hydrocarbon group of 1 to 50 carbon atoms or a halogenated hydrocarbon group of 1 to 50 carbon atoms, preferably a halogenated hydrocarbon group of 1 to 50 carbon atoms) are generally employed.

As the phosphorus compounds, phosphoric acids having P—O—H bond, phosphates having P—OR bond or P=O bond and phosphine oxide compounds are preferably employed.

The sulfonates employable herein are those represented by the following formula (IX):

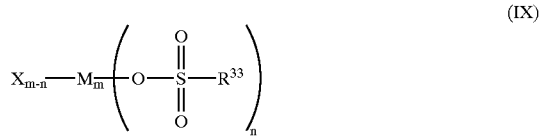

(IX)

wherein M is an atom selected from Group 1 to Group 14 of the periodic table; $R^{33}$ is hydrogen, a hydrocarbon group of 1 to 20 carbon atoms or a halogenated hydrocarbon group of 1 to 20 carbon atoms; X is a hydrogen atom, a halogen atom, a hydrocarbon group of 1 to 20 carbon atoms or a halogenated hydrocarbon group of 1 to 20 carbon atoms; m is an integer of 1 to 7; and 1·n·7.

In FIG. 1, steps for preparing the olefin polymerization catalyst of the invention are shown.

In the polymerization, the components can be used in any way and in any order. Some examples of the processes are given below.

(1) The component (A) and the compound (B) are fed to the polymerization reactor in an arbitrary order.

(2) A catalyst component wherein the component (A) is supported on the carrier (C), and the component (B) are fed to the polymerization reactor in an arbitrary order.

(3) A catalyst component wherein the component (B) is supported on the carrier (C), and the component (A) are fed to the polymerization reactor in an arbitrary order.

(4) A catalyst component wherein the component (A) is supported on the carrier (C), and a catalyst component wherein the component (B) is supported on the carrier (C) are fed to the polymerization reactor in an arbitrary order.

(5) A catalyst component wherein the component (A) and the component (B) are supported on the carrier (C) is fed to the polymerization reactor.

In the above processes, two or more of the catalyst components may be previously contacted.

An olefin may be prepolymerized onto a solid catalyst component wherein the component (A) and the component (B) are supported on the carrier (C). On the prepolymerized solid catalyst component, a catalyst component may be further supported.

In the process for olefin polymerization according to the invention, an olefin is polymerized or copolymerized in the presence of the above-mentioned olefin polymerization catalyst to obtain an olefin polymer.

In the present invention, the polymerization can be carried out as any of liquid phase polymerization, such as solution polymerization or suspension polymerization, and gas phase polymerization.

Examples of inert hydrocarbon media for use in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

In the polymerization of an olefin using the olefin polymerization catalyst, the component (A) is used in an amount of usually $10^{-12}$ to $10^{-2}$ mol, preferably $10^{-10}$ to $10^{-3}$ mol.

The component (B-1) is used in such an amount that the molar ratio ((B-1)/(M)) of the component (B-1) to the transition metal atom (M) in the component (A) becomes usually 0.01 to 100000, preferably 0.05 to 50000. The component (B-2) is used in such an amount that the molar ratio ((B-2)/(M)) of the aluminum atom in the component (B-2) to the transition metal atom (M) in the component (A) becomes usually 10 to 500000, preferably 20 to 100000. The component (B-3) is used in such an amount that the molar ratio ((B-3)/(M)) of the component (B-3) to the transition metal atom (M) in the component (A) becomes usually 1 to 10, preferably 1 to 5.

When the component (B-1) is used as the component (B), the component (D) is optionally used in such an amount that the (D)/(B-1) ratio by mol becomes usually 0.01 to 10, preferably 0.1 to 5. When the component (B-2) is used as the component (B), the component (D) is optionally used in such an amount that the (D)/(B-2) ratio by mol becomes usually 0.001 to 2, preferably 0.005 to 1. When the component (B-3) is used as the component (B), the component (D) is optionally used in such an amount that the (D)/(B-3) ratio by mol becomes usually 0.01 to 10, preferably 0.1 to 5.

In the olefin polymerization using the olefin polymerization catalyst, the polymerization temperature is in the range of usually −50 to +200° C., preferably 0 to 170° C. The polymerization pressure is in the range of usually atmospheric pressure to 100 kg/cm², preferably atmospheric pressure to 50 kg/cm². The polymerization reaction can be carried out by any of batchwise, semi-continuous and continuous processes. The polymerization can be conducted in two or more stages under different reaction conditions.

The molecular weight of the resulting olefin polymer can be controlled by allowing hydrogen to be present in the polymerization system or by changing the polymerization temperature. The molecular weight can be controlled also by changing the type of the component (B).

Examples of the olefins which can be polymerized by the use of the olefin polymerization catalyst include:

straight-chain or branched α-olefins of 2 to 30 carbon atoms, preferably 2 to 20 carbon atoms, such as ethylene, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and cycloolefins of 3 to 30 carbon atoms, preferably 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

Polar monomers are also employable. Examples of the polar monomers include α,β-unsaturated carboxylic acids, such as acrylic acid, methacrylic acid, fumaric acid, maleic anhydride, itaconic acid, itaconic anhydride and bicyclo[2,2,1]-5-heptene-2,3-dicarboxylic anhydride; metallic salts of α,β-unsaturated carboxylic acids, such as sodium salts, potassium salts, lithium salts, zinc salts, magnesium salts and calcium salts of the above acids; α,β-unsaturated carboxylic esters, such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; vinyl esters, such as vinyl acetate, vinyl propionate, vinyl caproate, vinyl caprate, vinyl laurate, vinyl stearate and vinyl trifluoroacetate; unsaturated glycidyl esters, such as glycidyl acrylate, glycidyl methacrylate and monoglycidyl itaconate; and halogen-containing olefins, such as vinyl chloride and vinyl fluoride.

Vinylcyclohexane, dienes and polyenes are also employable. The dienes and the polyenes employable herein are cyclic or chain compounds having 4 to 30 carbon atoms, preferably 4 to 20 carbon atoms, and having two or more double bonds. Examples of such compounds include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadione, 7-methyl-1,6-octadiene, 4-ethylidene-8-methyl-1,7-nonadiene and 5,9-dimethyl-1,4,8-decatriene.

Aromatic vinyl compounds are also employable. Examples of such compounds include mono- or polyalkylstyrenes, such as styrene, o-methylstyrene, m-methylstyrene, p-methylstyrene, o,p-dimethylstyrene, o-ethylstyrene, m-ethylstyrene and p-ethylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; and other compounds, such as 3-phenylpropylene, 4-phenylpropylene and α-methylstyrene.

The olefins mentioned above can be used singly or in combination of two or more kinds.

EFFECT OF THE INVENTION

The olefin polymerization catalyst according to the present invention exhibits a high polymerization activity against olefins.

EXAMPLE

The present invention is further described with reference to the following examples, but it should by construed that the invention is in no way limited to those examples.

Some examples of syntheses of complexes are given below.

The structures of the compounds obtained in the synthesis examples were determined by 270 MHz $^1$H-MM (Japan Electron Optics Laboratory GSH-270 Model), FD-mass spectrometry (Japan Electron Optics Laboratory SX-102A Model) and metal content analysis (analysis by ICP method after dry washing and dissolution in dilute nitric acid, device: SHIMADZU ICPS-8000 Model).

Synthesis Example 1

Synthesis of Ligand Precursor (1)

Into a 300 ml reactor thoroughly purged with nitrogen, 150 ml of ethanol, 5.0 g (53 mmol) of aniline and 5.1 g (53 mmol) of pyrrole-2-carboxyaldehyde were introduced. To the reactor was further added 1 ml of formic acid, followed by stirring at room temperature for 24 hours. The reaction solution obtained was vacuum concentrated to remove the solvent and then subjected to silica gel column purification to obtain 6.0 g (34.9 mmol, yield: 66%) of a white solid. The analytical results of the white solid are described below.

$^1$H-NMR (CDCl$_3$): 6.3 (d, 1H), 6.69 (dd, 1H), 6.89 (d, 1H), 7.1–7.5 (m, 4H), 8.29 (s, 1H), 9.85 (brs, 1H); FD-mass spectrometry: 170.

From the above results, the white solid proved to be a compound (ligand precursor (1)) represented by the following formula.

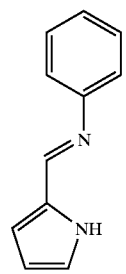

Synthesis of Transition Metal Compound (1-a)

In a 100 ml reactor thoroughly dried and purged with argon, 16 ml of a diethyl ether solution containing 1.04 g (6.08 mmol) of the ligand precursor (1) was cooled to −78° C. To the solution, 4.2 ml of a hexane solution containing 6.08 mmol of n-BuLi was slowly dropwise added, and then the temperature of the resulting solution was raised to room temperature. The solution was then slowly dropwise added to a mixture consisting of 6.08 ml of a heptane solution of titanium tetrachloride (concentration of titanium tetrachloride: 0.5 mmol/ml) and 16 ml of diethyl ether, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a dark brown solid. The solid was filtered off on a glass filter, washed with pentane and vacuum dried to obtain 1.10 g (2.40 mmol, yield: 79%) of a dark brown solid. The analytical results of the dark brown solid are described below.

$^1$H-HMR (CDCl$_3$): 6.0–7.9 (m, 16H), 7.80 (s, 2H); FD-mass spectrometry: 456(M$^+$); Elemental analysis: Ti: 10.4% (calculated value: 10.5%);

From the above results, the dark brown solid proved to be a compound (transition metal compound (1-a)) represented by the following formula.

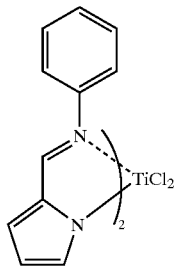

Systhesis Example 2

Synthesis of Transition Metal Compound (1-b)

Into a 300 ml reactor thoroughly dried and purged with argon, 1.11 g (2.95 mol) of a zirconium tetrachloride/2THF complex and 40 ml of tetrahydrofuran were introduced, and they were cooled to −78° C. To the reactor, 15 ml of a diethyl ether solution containing 1.02 g (6.0 mmol) of the ligand precursor (1) was slowly dropwise added. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was dissolved in 10 ml of methylene chloride, and to the solution was slowly added 70 ml of pentane with stirring. The mixture was allowed to stand at room temperature to precipitate reddish brown crystals. The crystals were filtered off on a glass filter, washed with pentane and vacuum dried to obtain 0.35 g (0.70 mmol, yield: 24%) of a yellowish green solid. The analytical results of the yellowish green solid are described below.

$^1$H-NMR (CDCl$_3$): 6.55–7.85 (m, 16H), 8.95 (s, 2H); FD-mass spectrometry: 500(M$^+$); Elemental analysis: Zr: 18.4% (calculated value: 18.2%).

From the above results, the yellowish green solid proved to be a compound (transition metal compound (1-b)) represented by the following formula.

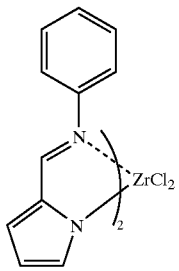

Synthesis Example 3

Synthesis of Ligand Precursor (2)

In an atmosphere of nitrogen, 24.8 g (0.26 mol) of pyrrole-2-carboxyaldehyde was introduced into 44.8 g (0.50 mol) of a 50% aqueous solution of dimethylamine to give a solution. After the solution was stirred at room temperature for 3 hours, water was added to the solution. As a result, a light yellow slurry was obtained. The precipitate was filtered, washed with dichloromethane and water, and then vacuum dried to obtain 29.6 g (yield: 92.0%) of a purple solid (dimer compound (2a) represented by the following formula).

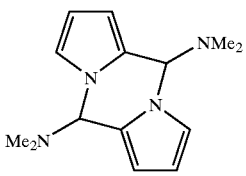

In an atmosphere of nitrogen, 5.0 g (20.5 mol) of the dimer compound was dissolved in 100 ml of THF. After the solution was cooled to −15° C., 31.9 ml of a hexane solution containing 49.0 mmol of n-BuLi was slowly dropwise added, and the temperature of the resulting solution was raised to room temperature. The solution was then cooled to −78° C., and 3.1 ml (49.0 mmol) of methyl iodide was slowly dropwise added. The temperature of the resulting solution was raised to room temperature, and the solution was stirred for 3 hours. The reaction solution was quenched with a 0.4 mole sodium acetate aqueous solution, and the organic layer was extracted and recrystallized from ethyl acetate to obtain 3.27 g (12.0 mmol, yield: 59%) of a white solid (α-methyl substituted dimer compound represented by the following formula).

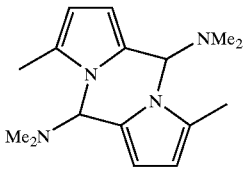

The α-methyl substituted dimer compound was dissolved in 40 ml of THF, and the solution was mixed with 60 ml of a 0.4 mole sodium acetate aqueous solution. The reaction of the mixture was conducted for 6 hours under reflux, whereby hydrolysis proceeded. After the reaction was completed, the organic layer was extracted with diethyl other, then the solvent was distilled off, and the remainder was vacuum dried to obtain 2.53 g (23.2 mmol, yield: 96.7%) of 5-methylpyrrole-2-carboxyaldehyde as a reddish purple solid.

Thereafter, 2.52 g of the 5-methylpyrrole-2-carboxyaldehyde was allowed to react with 2.12 g (22.8 mmol) of aniline in the same manner as in the synthesis of the ligand precursor (1), to obtain 2.39g (yield: 57%) of a brown solid. The analytical results of the brown solid are described below.

$^1$H-NMR (CDCl$_3$): 2.56 (s, 3H), 6.31 (d, 1H), 7.2–b 7.7 (m, 6H), 8.10 (s, 1H), 13.88 (brs, 1H); FD-mass spectrometry: 184(M$^+$).

From the above results, the brown solid proved to be a compound (ligand precursor (2)) represented by the following formula.

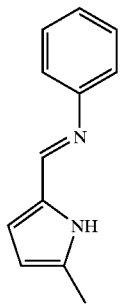

Synthesis of Transition Metal Compound (2-A)

In a 100 ml reactor thoroughly dried and purged with argon, 20 ml of a diethyl ether solution containing 0.76 g (4.11 mol) of the ligand precursor (2) was cooled to −78° C. To the solution, 2.8 ml of a heptane solution containing 4.48 mmol of n-BuLi was slowly dropwise added, and the temperature of the resulting solution was raised to room temperature. The solution was then slowly dropwise added to a mixture consisting of 3.9 ml of a heptane solution of titanium tetrachloride (concentration of titanium tetrachloride: 0.5 mmol/ml) and 20 ml of diethyl other, said mixture having been cooled to −78° C. After the dropwise addition was completed, the temperature of the resulting solution was slowly raised to roam temperature with stirring. Then, the solution was further stirred at room temperature for 8 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a dark brown solid. The solid was filtered off on a glass filter, washed with hexane and vacuum dried to obtain 0.23 g (0.47 mmol, yield: 23%) of a dark green solid. The analytical results of the dark green solid are described below.

$^1$H-NMR (CDCl$_3$): 2.52 (s, 6H), 6.1–8.0 (m, 16H); FD-mass spectrometry: 484(M$^+$); Elemental analysis: Ti: 9.7% (calculated value: 9.9%).

From the above results, the dark green solid proved to be a compound (transition metal compound (2-A)) represented by the following formula.

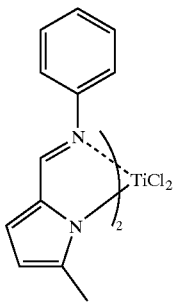

Synthesis Example 4

Synthesis of Ligand Precursor (3)

In an atmosphere of nitrogen, 10.1 g (41.3 mmol) of the dimer compound (2a) which was a synthetic intermediate of the ligand precursor (2) was dissolved in 200 ml of THF, and the solution was cooled to −15° C. To the solution, 62 ml of a hexane solution containing 99.2 mol of n-BuLi was slowly dropwise added, and the temperature of the resulting solution was raised to room temperature. Then, the solution was cooled to −78° C., and 12.5 ml (99.2 mmol) of trimethylsilyl chloride was dropwise added. Thereafter, the temperature of the resulting solution was raised to room temperature, and the solution was stirred for 3 hours. The reaction solution was quenched with a 0.4 mole sodium acetate aqueous solution, and the organic layer was extracted to obtain 16.6 g (41.3 mmol, yield: 100%) of an α-trimethylsilyl substituted dimer compound as white needle crystals.

Then, 12.4 g (32.0 mmol) of the α-trimethylsilyl substituted dimer compound was dissolved in 150 ml of THF, and the solution was mixed with 300 ml of a 0.75 mole sodium acetate aqueous solution. The reaction of the mixture was conducted for 15 hours under reflux, whereby hydrolysis proceeded. After the reaction was completed, the organic layer was extracted with diethyl ether, then the solvent was distilled off, and the remainder was vacuum dried to obtain 10.7 g (64.0 mmol, yield: quant.) of 5-trimethylsilylpyrrole-2-carboxyaldehyde.

Thereafter, 5.0 g (28.7 mol) of the 5-trimethylsilylpyrrole-2-carboxyaldehyde was allowed to react with 2.67 g (28.7 mmol) of aniline in the same or as in the synthesis of the ligand precursor (1), to obtain 4.18 g (yield: 54%) of a wine red oil (GC purity: 90%).

$^1$H-NMR (CDCl$_3$): 0.30 (m, 9H), 6.49 (d, 1H), 6.81 (d, 1H), 7.1–7.5 (m, 5H), 8.29 (s, 1H), 9.35 (brs, 1H); FD-mass spectrometry: 242(M$^+$).

From the above results, the wine red oil proved to be a compound (ligand precursor (3)) represented by the following formula.

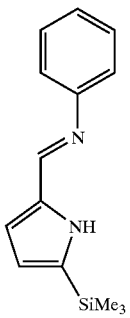

Synthesis Example 5

Synthesis of Transition Metal Compound (3-A)

In a 100 ml reactor thoroughly dried and purged with argon, 20 ml of a diethyl ether solution containing 0.848 g (3.50 mmol) of the ligand precursor (3) was cooled to −78° C. To the solution, 2.8 ml of a hexane solution containing 4.48 mmol of n-BuLi was slowly dropwise added, and the temperature of the resulting solution was raised to room temperature. The solution was then slowly dropwise added to a mixture consisting of 3.5 ml of a heptane solution of titanium tetrachloride (concentration of titanium tetrachloride: 0.5 mmol/ml) and 20 ml of diethyl ether, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was subjected to recrystallization from hexane and then vacuum dried to obtain 0.52 g (0.86 mmol, yield: 49%) of a black solid. The analytical results of the black solid are described below.

$^1$H-NMR (CDCl$_3$): 0.60 (s, 18H), 6.2–6.4 (m, 4H), 6.9–7.2 (m, 10H), 7.82 (s, 2H); FD-mass spectrometry: 600(M$^+$); Elemental analysis: Ti: 7.8% (calculated value: 8.0%).

From the above results, the black solid proved to be a compound (transition metal compound (3-A)) represented by the following formula.

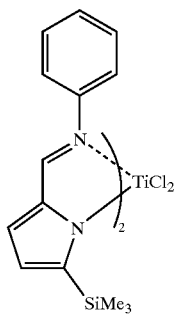

Synthesis Example 6

Synthesis of Transition Metal Compound (3-B)

Into a 100 ml reactor thoroughly dried and purged with argon, 0.45 g (1.19 mmol) of a zirconium tetrachloride/2THF complex and 15 ml of THF were introduced, and they were cooled to −78° C. To the resulting solution, 15 ml of a THF solution containing 0.58 g (3.7 mmol) of the ligand precursor (3) was slowly dropwise added. After the dropwise addition was completed, the temperature of the resulting solution was slowly raised to room temperature with stirring. Then, the solution was further stirred for 7 hours under heating at 55° C. After the reaction solution was filtered, the filtrate was vacuum concentrated. The solid precipitated was washed with hexane and vacuum dried to obtain 0.70 g (1.09 mmol, yield: 91%) of mud yellow solid. The analytical results of the mud yellow solid are described below.

$^1$H-NMR (CDCl$_3$): 0.53 (s, 18H), 6.38 (d, 2H), 6.43 (d, 2H), 6.8–7.2 (m, 10H), 7.87 (s, 2H); FD-mass spectrometry: 644(M$^+$); Elemental analysis: Zr: 14.4% (calculated value: 14.2%).

From the above results, the mud yellow solid proved to be a compound (transition metal compound (3-B)) represented by the following formula.

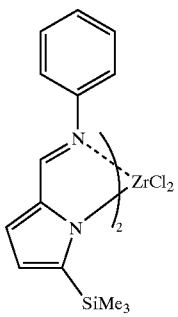

Synthesis Example 7

Synthesis of Ligand Precursor (4)

Into a 300 ml reactor thoroughly purged with nitrogen, 150 ml of ethanol, 5.22 g (52.6 mmol) of cyclohexylamine and 5.0 g (52.6 mmol) of pyrrole-2-carboxyaldehyde were introduced to dissolve cyclohexylamine and pyrrole-2-carboxyaldehyde in ethanol, and the solution was stirred at room temperature for 24 hours. The reaction solution was vacuum concentrated to remove the solvent and vacuum dried to obtain 8.88 g (50.4 mmol, yield: 96%) of a dark brown oil. The analytical results of the dark brown oil are described below.

$^1$H-NMR (CDCl$_3$): 1.1–1.9 (m, 10H), 3.0–3.2 (m, 1H), 6.21 (d, 1H), 6.48 (d, 1H), 6.89 (dd, 1H), 8.13 (s, 1H), 8.35 (brs, 1H); FD-mass spectrometry: 176.

From the above results, the dark brown oil proved to be a compound (ligand precursor (4)) represented by the following formula.

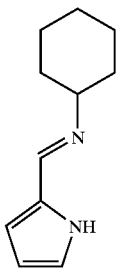

Synthesis of Transition Metal Compound (4-A)

In a 100 ml reactor thoroughly dried and purged with argon, 25 ml of a diethyl ether solution containing 1.02 g (5.78 mol) of the ligand precursor (4) was cooled to −78° C. To the solution, 3.8 ml of a hexane solution containing 6.08 mmol of n-BuLi was slowly dropwise added, and the temperature of the resulting solution was raised to room temperature. The solution was then slowly dropwise added to a mixture consisting of 5.78 ml of a heptane solution of titanium tetrachloride (concentration of titanium tetrachloride: 0.5 mmol/ml) and 25 ml of diethyl ether, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off on a glass filter, washed with hexane and vacuum dried to obtain 0.52 g (1.11 mmol, yield: 38%) of a black solid. The analytical results of the black solid are described below.

$^1$H-NNR (CDCl$_3$): 0.7–2.7 (m, 22H), 6.2–7.9 (m, 6H), 8.00 (s, 2H); FD-mass spectrometry: 468(M$^+$); Elemental analysis: Ti: 17.8% (calculated value: 17.8%).

From the above results, the black solid proved to be a compound (transition metal compound (4-A)) represented by the following formula.

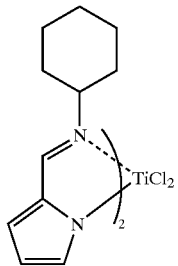

Synthesis Example 8

Synthesis of Transition Metal Compound (4-B)

In a 100 ml reactor thoroughly dried and purged with argon, 30 ml of a diethyl ether solution containing 1.11 g (6.28 mol) of the ligand precursor (4) was cooled to −78° C. To the solution, 3.8 ml of a hexane solution containing 6.08 mol of n-BuLi was slowly dropwise added, and the temperature of the resulting solution was raised to room temperature. The solution was then slowly dropwise added to a mixture consisting of 1.14 g of a ZrCl$_4$(THF)$_2$ complex (3.0 mmol) and 40 ml of THF, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was filtered off on a glass filter, washed with hexane and vacuum dried to obtain 0.78 g (1.52 mmol, yield: 48%) of a yellow solid. The analytical results of the yellow solid are described below.

$^1$H-NMR (CDCl$_3$): 0.6–2.0 (m, 20H), 2.6–3.2 (m, 2H), 6.0–6.9 (m, 6H), 8.07 (s, 2H); FD-mass spectrometry: 512(M$^+$); Elemental analysis: Zr: 18.1% (calculated value: 17.8%).

From the above results, the yellow solid proved to be a compound (transition metal compound (4-B)) represented by the following formula.

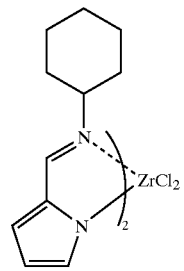

Synthesis Example 9

Synthesis of Transition Metal Compound (4-C)

In a 100 ml reactor thoroughly dried and purged with argon, 25 ml of a THF solution containing 1.02 g (5.78 mmol) of the ligand precursor (4) was cooled to −78° C. To the solution, 3.8 ml of a hexane solution containing 6.08 mmol of n-BuLi was slowly dropwise added, and the temperature of the resulting solution was raised to room temperature. The solution was then slowly dropwise added to 25 ml of a THF solution containing 1.08 g (2.89 mol) of a chromium trichloride/3THF complex, said THF solution having been cooled to −78° C. After the dropwise addition was completed, the temperature of the resulting solution was slowly raised to room temperature with stirring. To the solution was then added 2.7 ml (2.90 mmol) of a 1.0 mole trimethylaluminum toluene solution. The resulting solution was further stirred at room temperature for 2 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off on a glass filter, washed with hexane and vacuum dried to obtain 0.09 g (0.22 mmol, yield: 8%) of a black solid. The analytical result of the black solid is described below.

FD-mass spectrometry: 417(M$^+$).

From the above result, the black solid proved to be a compound (transition metal compound (4-C)) represented by the following formula.

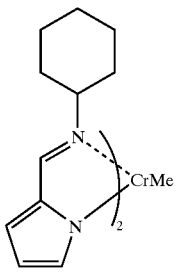

Synthesis Example 10

Synthesis of Ligand Precursor (5)

Into a 300 ml reactor thoroughly purged with nitrogen, 150 ml of ethanol, 26.3 ml of a methanol solution containing 52.6 mmol of ethylamine and 5.0 g (52.6 mol) of pyrrole-2-carboxyaldehyde were introduced to dissolve ethylamine and pyrrole-2-carboxyaldehyde in ethanol, and the solution was stirred at room temperature for 24 hours. The reaction solution was vacuum concentrated to remove the solvent and then vacuum dried to obtain 4.15 g (34.0 mmol, yield: 65%) of a reddish brown powder. The analytical results of the reddish brown powder are described below.

$^1$H-NMR (CDCl$_3$): 1.26 (t, 3H), 3.56 (q, 2H), 6.26 (d, 1H), 6.43 (d, 1H), 6.89 (dd, 1H), 8.13 (s, 1H), 9.20 (brs, 1H); FD-mass spectrometry: 122.

From the above results, the reddish brown powder proved to be a compound (ligand precursor (5)) represented by the following formula.

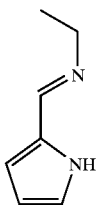

Synthesis of Transition Metal Compound (5-A)

In a 100 ml reactor thoroughly dried and purged with argon, 24 ml of a diethyl ether solution containing 80 g (6.55 mmol) of the ligand precursor (5) was cooled to −78° C. To the solution, 4.3 ml of a hexane solution containing 6.88 mmol of n-BuLi was slowly dropwise added, and the temperature of the resulting solution was raised to room temperature. The solution was then slowly dropwise added to a mixture consisting of 6.6 ml of a heptane solution of titanium tetrachloride (concentration of titanium tetrachloride: 0.5 mmol/ml) and 25 ml of diethyl ether, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off on a glass filter, washed with hexane and vacuum dried to obtain 0.68 g (1.88 mmol, yield: 58%) of a black solid. The analytical results of the black solid are described below.

$^1$H-NMR (CDCl$_3$): 1.05 (t, 6H), 3.09 (q, 4H), 6.2–7.9 (m, 6H), 8.00 (s, 2H); FD-mass spectrometry: 360(M$^+$); Elemental analysis: Ti: 13.3% (calculated value: 13.3%).

From the above results, the black solid proved to be a compound (transition metal compound (5-A)) represented by the following formula.

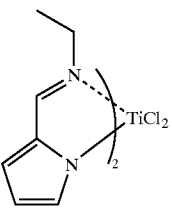

Synthesis Example 11

Synthesis of Ligand Precursor (6)

Into a 300 ml reactor thoroughly purged with nitrogen, 150 ml of ethanol, 4.73 q (50.8 mmol) of aniline and 4.9 g (49.8 mmol) of imidazole-4-carbozyaldehyde were introduced to dissolve aniline and imidazole-4-carboxyaldehyde in ethanol, and the solution was stirred at room temperature for 20 hours. The reaction solution was vacuum concentrated to remove the solvent and then vacuum dried to obtain 8.47 g (49.5 mmol, yield: 99%) of a white powder. The analytical results of the white powder are described below.

$^1$H-NMR (CDCl$_3$): 6.6–7.9 (m, 7H), 8.43 (s, 1H); FD-mass spectrometry: 171.

From the above results, the white powder proved to be a compound (ligand precursor (6)) represented by the following formula.

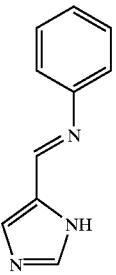

Synthesis of Transition Metal Compound (6-A)

In 100 ml reactor thoroughly dried and purged with argon, 30 ml of a diethyl ether solution containing 1.03 g (6.02 mmol) of ligand precursor (6) was cooled to −78° C. To the solution 3.76 ml of a hexane solution containing 6.02 mmol of n-BuLi was slowly dropwise added, and the temperature of the resulting solution was raised to room temperature. The solution was then slowly dropwise added to a mixture consisting of 6.0 ml of a heptane solution of titanium tetrachloride (concentration of titanium tetrachloride: 0.5 mmol/ml) and 30 ml of diethyl ether, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off on a glass filter, washed with hexane and vacuum dried to obtain 0.11 g (0.24 mmol, yield: 8%) of a black solid. The analytical results of the black solid are described below.

$^1$H-NMR (CDCl$_3$): 6.0–7.7 (m, 16H); FD-mass spectrometry: 458(M$^+$).

From the above results, the black solid proved to be a compound (transition metal compound (6-A)) represented by the following formula.

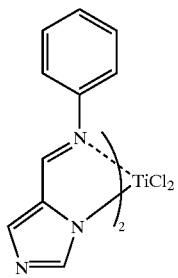

Synthesis Example 12

Synthesis of Ligand Precursor (7)

Into a 300 ml reactor thoroughly purged with nitrogen, 90 ml of ethanol, 1.92 g (21 mmol) of aniline and 3.0 g (21 mmol) of indole-2-aldehyde were introduced, then 0.2 ml of acetic acid was added, and the mixture wax stirred at room temperature for 24 hours. The reaction solution was vacuum concentrated to remove the solvent, and the concentrate was purified by the use of hexane and dichloromethane to obtain 4.17 g (20 mmol, yield: 93.2%) of a deep red powder. The analytical results of the deep red solid are described below.

$^1$H-NMR (CDCl$_3$): 6.98 (s, 1H), 7.1–7.8 (m, 9H), 8.50 (s, 1H), 9.32 (brs, 1H); FD-mass spectrometry: 220.

From the above results, the deep red solid proved to be a compound (ligand precursor (7)) represented by the following formula.

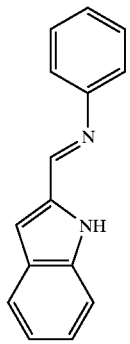

Synthesis of Transition Metal Compound (7-A)

In a 100 ml reactor thoroughly dried and purged with argon, 20 ml of a diethyl ether solution containing 1.0 g (4.54 mmol) of the ligand precursor (7) was cooled to −78° C. To the solution, 2.98 ml of a hexane solution containing 6.08 mmol of n-BuLi was slowly dropwise added, and the temperature of the resulting solution was raised to room temperature. The solution was then slowly dropwise added to a mixture consisting of 4.54 ml of a heptane solution of titanium tetrachloride (concentration of titanium tetrachloride: 0.5 mmol/ml) and 20 ml of diethyl ether, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was washed with hexane, and the resulting black powder was dissolved in 10 ml of ether and 50 ml of methylene chloride. The solution was filtered through a glass filter, and the filtrate was concentrated to obtain a black powder. The black powder was washed with hexane and vacuum dried to obtain 0.79 g (1.41 mmol, yield: 61%) of a dark brown solid. The analytical results of the dark brown solid are described below.

$^1$H-NMR (CDCl$_3$): 6.0–8.5 (m, 20H), 8.92 (s, 2H); FD-mass spectrometry: 556(M$^+$).

From the above results, the dark brown solid proved to be a compound (transition metal compound (7-A)) represented by the following formula.

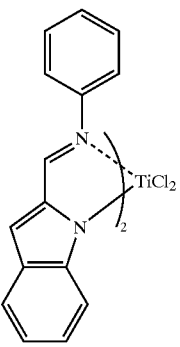

Synthesis Example 13

Synthesis of Ligand Precursor (8)

Into a 300 ml reactor thoroughly purged with nitrogen, 150 ml of ethanol, 12.05 g (52.58 mmol) of 3,5-bis(trifluoromethyl)aniline and 5.0 g (52.58 mmol) of pyrrole-2-carboxyaldehyde were introduced, then 0.2 ml of acetic acid was added, and the mixture was stirred at room temperature for 1 week. The reaction solution was vacuum concentrated to remove the solvent, and the concentrate was purified by the use of hexane and dichloromethane to obtain 9.65 g (31.5 mmol, yield: 60.0%) of a dark brown solid. The analytical results of the dark brown solid are described below.

$^1$H-NMR (CDCl$_3$): 6.39 (dd, 1H), 6.80 (d, 1H), 7.08 (d, 1H), 7.60 (s, 2H), 7.68 (s, 1H), 8.30 (s, 1H), 9.40 (brs, 1H); FD-mass spectrometry: 306.

From the above results, the dark brown solid proved to be a compound (ligand precursor (8)) represented by the following formula.

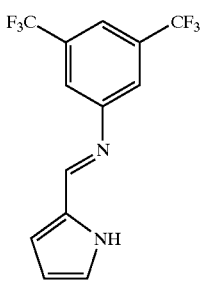

Synthesis of Transition Metal Compound (8-A)

In a 100 ml reactor thoroughly dried and purged with argon, 40 ml of a diethyl ether solution containing 1.02 g (3.32 mmol) of the ligand precursor (8) was cooled to −78° C. To the solution, 2.22 ml of a hexane solution containing 3.55 mmol of n-BuLi was slowly dropwise added, and the temperature of the resulting solution was raised to room temperature. The solution was then slowly dropwise added to a mixture consisting of 3.25 ml of a heptane solution of titanium tetrachloride (concentration of titanium tetrachloride: 0.5 mmol/ml) and 40 ml of diethyl ether, said mixture having been cooled to −78° C. After the dropwise addition was completed, the temperature of the resulting solution was slowly raised to room temperature with stirring. Then, the solution was further stirred at room temperature for 12 hours. The reaction solution was filtered through a glass filter, and the filtrate was vacuum concentrated. The solid precipitated was washed with hexane, and the resulting black solid was vacuum dried to obtain 0.75 g (1.02 mmol, yield: 62%) of a dark brown solid. The analytical results of the dark brown solid are described below.

$^1$H-NMR (CDCl$_3$): 6.18 (dd, 2H), 6.48 (d, 2H), 6.62 (d, 2H), 7.0–8.5 (s, 8H); FD-mass spectrometry: 728(M$^+$).

From the above results, the dark brown solid proved to be a compound (transition metal compound (8-A)) represented by the following formula.

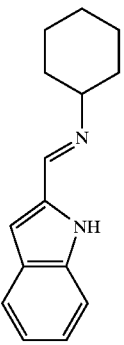

Synthesis Example 14

Synthesis of Ligand Precursor (9)

Into a 200 ml reactor thoroughly purged with nitrogen, 90 ml of ethanol, 2.0 g (20.25 mmol) of cyclohexylaniline and 3.0 g (20.25 mmol) of indole-2-aldehyde were introduced, and they were stirred at room temperature for 12 hours. The reaction solution was vacuum concentrated to remove the solvent, and the concentrate was crystallized and purified by the use of hexane to obtain 3.46 g (15.3 mmol, yield: 75.5%) of a brown solid. The analytical results of the brown solid are described below.

$^1$H-NMR (CDCl$_3$): 1.0–2.0 (m, 10H), 3.1–3.4 (m, 1H), 6.70 (s, 1H), 7.0–7.7 (m, 4H), 8.32 (s, 1H), 9.30 (brs, 1H); FD-mass spectrometry: 226.

From the above results, the brown solid proved to be a compound (ligand precursor (9)) represented by the following formula.

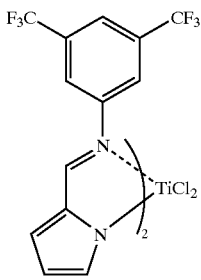

Synthesis of Transition Metal Compound (9-A)

In a 100 ml reactor thoroughly dried and purged with argon, 30 ml of a diethyl ether solution containing 1.02 g (4.51 mmol) of the ligand precursor (9) was cooled to −78° C. To the solution, 2.9 ml of a hexane solution containing 4.51 mmol of n-BuLi was slowly dropwise added, and the temperature of the resulting solution was raised to room temperature. The solution was then slowly dropwise added to a mixture consisting of 4.5 ml of a heptane solution of titanium tetrachloride (concentration of titanium tetrachloride: 0.5 mmol/ml) and 40 ml of diethyl ether, said mixture having been cooled to −78° C. After the dropwise addition was completed, the temperature of the resulting solution was slowly raised to room temperature with stirring. Then, the solution was further stirred at room temperature for 12 hours. The reaction solution was filtered through a glass filter, and the resulting black solid was washed with diethyl ether. The solid was extracted with dichloromethane ad vacuum concentrated. The solid precipitated was washed with hexane, and the resulting black solid was vacuum dried to obtain 0.84 g (1.48 mmol, yield: 65%) of a black solid. The analytical results of the black solid are described below.

$^1$H-NMR (CDCl$_3$): 0.3–2.8 (m, 22H), 6.7–7.8 (m, 8H), 8.30 (s, 2H), 8.95 (d, 2H); FD-mass spectrometry: 568(M$^+$).

From the above results, the black solid proved to be a compound (transition metal compound (9-A)) represented by the following formula.

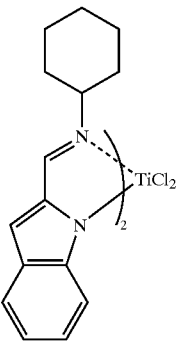

Synthesis Example 15

Synthesis of Ligand Precursor (10)

Into a 200 ml reactor thoroughly purged with nitrogen, 100 ml of ethanol, 5.67 g (21.0 mmol) of n-octadecylamine and 2.0 g (21.0 mmol) of pyrrole-2-carboxyaldehyde were introduced, and they were stirred at room temperature for 12 hours. The reaction solution was vacuum concentrated to remove the solvent, and the concentrate was vacuum dried to obtain 6.46 g (18.6 mmol, yield: 88.5%) of a white powder. The analytical results of the white powder are described below.

$^1$H-NMR (CDCl$_3$): 0.90 (t, 3H), 1.28 (m, 30H), 1.62 (m, 2H), 3.52 (t, 2H), 6.24 (dd, 1H), 6.48 (d, 1H), 6.88 (d, 1H), 8.08 (s, 1H), 9.20 (brs, 1H); FD-mass spectrometry: 346.

From the above results, the white powder proved to be a compound (ligand precursor (10)) represented by the following formula.

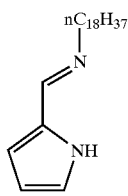

Synthesis of Transition Metal Compound (10-A)

In a 100 ml reactor thoroughly dried and purged with argon, 40 ml of a diethyl ether solution containing 1.0 g (2.91 mmol) of the ligand precursor (10) was cooled to −78° C. To the solution, 1.95 ml of a hexane solution containing 2.91 mmol of n-BuLi was slowly dropwise added, and the temperature of the resulting solution was raised to room temperature. The solution was then slowly dropwise added to a mixture consisting of 2.9 ml of a heptane solution of titanium tetrachloride (concentration of titanium tetrachloride: 0.5 mmol/ml) and 30 ml of diethyl ether, said mixture having been cooled to −78° C. After the dropwise addition was completed, the temperature of the resulting solution was slowly raised to room temperature with stirring. Then, the solution was further stirred at room temperature for 8 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off by a glass filter, washed with hexane and vacuum dried to obtain 0.44 g (0.54 mmol, yield: 37%) of a black solid. The analytical results of the black solid are described below.

$^1$H-NMR (CDCl$_3$): 0.9–2.0 (m, 70H), 2.8–3.3 (m, 4H), 6.2–7.9 (m, 6H), 8.88 (s, 2H); FD-mass spectrometry: 809(M$^+$).

From the above results, the black solid proved to be a compound (transition metal compound (10-A)) represented by the following formula.

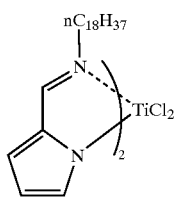

Synthesis Example 16

Synthesis of Ligand Precursor (11)

Into a 200 ml reactor thoroughly purged with nitrogen, 100 ml of ethanol, 6.47 g (52.54 mmol) of p-anisidine and 5.0 g (52.58 mmol) of pyrrole-2-carbozyaldehyde were introduced, then 0.5 ml of acetic acid was added, and the mixture was stirred at room temperature for 3 days. The reaction solution was vacuum concentrated to remove the solvent, and the concentrate was vacuum dried to obtain 10.24 g (51.1 mmol, yield: 96.3%) of an umber powder. The analytical results of the umber powder are described below.

$^1$H-NMR (CDCl$_3$): 3.82 (s, 3H), 6.28 (dd, 1H), 6.68 (d, 1H), 6.8–7.0 (m, 3H), 7.1–7.3 (m, 2H), 8.30 (s, 1H), 10.10 (brs, 1H); FD-mass spectrometry: 200.

From the above results, the umber powder proved to be a compound (ligand precursor (11)) represented by the following formula.

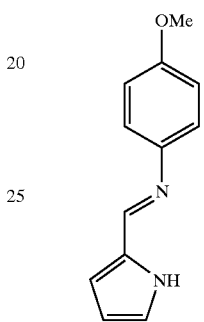

Synthesis of Transition Metal Compound (11-A)

In a 100 ml reactor thoroughly dried and purged with argon, 40 ml of a diethyl ether solution containing 1.03 g (5.12 mmol) of the ligand precursor (11) was cooled to −78° C. To the solution, 3.4 ml of a hexane solution containing 5.12 mmol of n-BuLi was slowly dropwise added, and the temperature of the resulting solution was raised to room temperature. The solution was then slowly dropwise added to a mixture consisting of 5.0 ml of a heptane solution of titanium tetrachloride (concentration of titanium tetrachloride: 0.5 mmol/ml) and 30 ml of diethyl other, said mixture having been cooled to −78° C. After the dropwise addition was completed, the temperature of the resulting solution was slowly raised to room temperature with stirring. Then, the solution was further stirred at room temperature for 12 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off by a glass filter, washed with hexane and vacuum dried to obtain 0.64 g (1.24 mmol, yield: 48%) of a black solid. The analytical results of the black solid are described below.

$^1$H-NMR (CDCl$_3$): 3.6–4.0 (m, 6H), 6.0–8.2 (m, 16H); FD-mass spectrometry: 516(M$^+$).

From the above results, the black solid proved to be a compound (transition metal compound (11-A)) represented by the following formula.

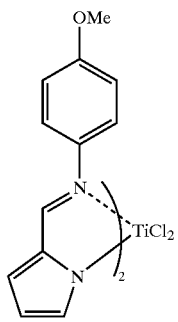

Synthesis Example 17

Synthesis of Ligand Precursor (12)

Into a 200 ml reactor thoroughly purged with nitrogen, 80 ml of ethanol, 8.64 g (53.63 mmol) of trifluoro-p-toluidine and 5.1 g (53.63 mmol) of pyrrole-2-carboxyaldehyde were introduced, then 0.5 ml of acetic acid was added, and the mixture was stirred at roam temperature for 3 days. The reaction solution was vacuum concentrated to remove the solvent, and the concentrate was vacuum dried to obtain 10.16 g (42.7 mmol, yield: 79.5%) of a black solid. The analytical results of the black solid are described below.

$^1$H-NMR (CDCl$_3$): 6.30 (dd, 1H), 6.72 (d, 1H), 6.98 (d, 1H), 7.26 (d, 2H), 7.60 (d, 2H), 8.28 (s, 1H), 9.70 (brs, 1H); FD-mass spectrometry: 238.

From the above results, the black solid proved to be a compound (ligand precursor (12)) represented by the following formula.

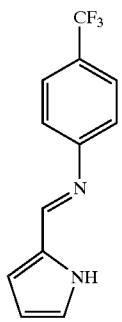

Synthesis of Transition Metal Compound (12-A)

In a 100 ml reactor thoroughly dried and purged with argon, 40 ml of a diethyl ether solution containing 1.13 g (4.73 mmol) of the ligand precursor (12) was cooled to −78° C. To the solution, 3.0 ml of a hexane solution containing 4.73 mmol of n-BuLi was slowly dropwise added, and the temperature of the resulting solution was raised to room temperature. The solution was then slowly dropwise added to a mixture consisting of 4.7 ml of a heptane solution of titanium tetrachloride (concentration of titanium tetrachloride: 0.5 mmol/ml) and 30 ml of diethyl ether, said mixture having been cooled to −78° C. After the dropwise addition was completed, the temperature of the resulting solution was slowly raised to room temperature with stirring. Then, the solution was further stirred at room temperature for 12 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off by a glass filter, washed with hexane and vacuum dried to obtain 0.81 g (1.37 mmol, yield: 58%) of a black powder. The analytical results of the black powder are described below.

$^1$H-MMR (CDCl$_3$): 6.10 (dd, 2H), 6.50 (d, 2H), 6.8–8.5 (m, 12H); FD-mass spectrometry: 592(M$^+$).

From the above results, the black powder proved to be a compound (transition metal compound (12-A)) represented by the following formula.

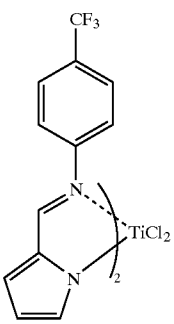

Synthesis Example 18

Synthesis of Ligand Precursor (13)

Into a 200 ml reactor thoroughly purged with nitrogen, 80 ml of ethanol, 4.56 g (33.72 mmol) of o-isopropylaniline and 3.22 g (33.83 mmol) of pyrrole-2-carboxyaldehyde were introduced, then 0.5 ml of acetic acid was added, and the mixture was stirred at room temperature for 3 days. The reaction solution was vacuum concentrated to remove the solvent, and the concentrate was vacuum dried to obtain 5.2 g (24.5 mmol, yield: 72.6%) of a white solid. The analytical results of the white solid are described below.

$^1$H-NMR (CDCl$_3$): 1.20 (d, 6H), 3.56 (m, 1H), 6.28 (dd, 1H), 6.5–7.0 (m, 2H), 7.1–7.4 (m, 4H), 8.20 (s, 1H), 9.78 (brs, 1H); FD-mass spectrometry: 212.

From the above results, the white solid proved to be a compound (ligand precursor (13)) represented by the following formula.

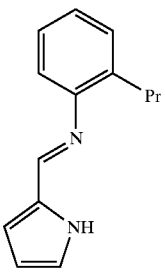

Synthesis of Transition Metal Compound (13-A)

In a 100 ml reactor thoroughly dried and purged with argon, 40 ml of a diethyl ether solution containing 1.0 g (4.71 mmol) of the ligand precursor (13) was cooled to −78° C. To the solution, 3.15 ml of a hexane solution containing 4.71 mmol of n-BuLi was slowly dropwise added, and the temperature of the resulting solution was raised to room temperature. The solution was then slowly dropwise added to a mixture consisting of 4.71 ml of a heptane solution of titanium tetrachloride (concentration of titanium tetrachloride: 0.5 mmol/ml) and 20 ml of diethyl ether, said mixture having been cooled to −78° C. After the dropwise addition was completed, the temperature of the resulting solution was slowly raised to room temperature with stirring. Then, the solution was further stirred at room temperature for 12 hours. The reaction solution was filtered through a glass filter, and the filtrate was vacuum concentrated. The solid precipitated was dissolved in 5 ml of methylene chloride, and to the solution was slowly added 10 ml of hexane with stirring. The mixture was allowed to stand at room temperature to precipitate a black solid. The solid was filtered off by a glass filter, washed with hexane and vacuum dried to obtain 0.22 g (0.41 mmol, yield: 17%) of a black powder. The analytical results of the black powder are described below.

$^1$H-NMR (CDCl$_3$): 1.0–1.4 (m, 12H), 3.4–3.6 (m, 2H), 6.3–8.0 (m, 16H); FD-mass spectrometry: 540(M$^+$).

From the above results, the black powder proved to be a compound (transition metal compound (13-A)) represented by the following formula.

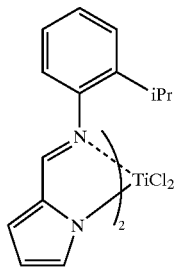

Synthesis Example 19

Synthesis of Ligand Precursor (14)

Into a 200 ml reactor thoroughly purged with nitrogen, 100 ml of ethanol, 5.0 g (49.4 mmol) of n-hexylamine and 4.7 g (49.4 mmol) of pyrrole-2-carboxyaldehyde were introduced, and they were stirred at room temperature for 12 hours. The reaction solution was vacuum concentrated to remove the solvent, and the concentrate was vacuum dried to obtain 8.54 g (47.9 mmol, yield: 96.4%) of a brown liquid. The analytical results of the brown liquid are described below.

$^1$H-NMR (CDCl$_3$): 0.90 (d, 3H), 1.30 (m, 6H), 1.65 (m, 2H), 3.52 (t, 2H), 6.24 (dd, 1H), 6.45 (d, 1H), 6.88 (d, 1H), 8.08 (s, 1H), 9.48 (brs, 1H); FD-mass spectrometry: 178.

From the above results, the brown liquid proved to be a compound (ligand precursor (14)) represented by the following formula.

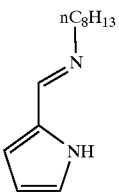

Synthesis of Transition Metal Compound (14-A)

In a 100 ml reactor thoroughly dried and purged with argon, 40 ml of a diethyl ether solution containing 1.03 g (5.72 mmol) of the ligand precursor (14) was cooled to −78° C. To the solution, 3.83 ml of a hexane solution containing 5.72 mmol of n-BuLi was slowly dropwise added, and the temperature of the resulting solution was raised to room temperature. The solution was then slowly dropwise added to a mixture consisting of 5.72 ml of a heptane solution of titanium tetrachloride (concentration of titanium tetrachloride: 0.5 mmol/ml) and 30 ml of diethyl ether, said mixture having been cooled to −78° C. After the dropwise addition was completed, the temperature of the resulting solution was slowly raised to room temperature with stirring. Then, the solution was further stirred at room temperature for 12 hours. The reaction solution was filtered through a glass filter, and the filtrate was vacuum concentrated. The solid precipitated was dissolved in 5 ml of methylene chloride, and to the solution was slowly added 40 ml of hexane with stirring. The mixture was allowed to stand at room temperature to precipitate a black solid. The solid was filtered off by a glass filter, washed with hexane and vacuum dried to obtain 0.50 g (1.05 mmol, yield: 37%) of a black solid. The analytical results of the black solid are described below.

hu 1H-NMR (CDCl$_3$): 0.8–1.6 (m, 22H), 2.7–3.3 (m, 4H), 6.28 (dd, 2H), 7.68 (d, 2H), 7.7–8.0 (m, 4H); FD-mass spectrometry: 472(M$^+$).

From the above results, the black solid proved to be a compound (transition metal compound (14-A)) represented by the following formula.

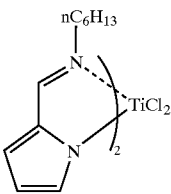

Examples 1–18

Into a 500 ml glass autoclave thoroughly purged with nitrogen, 250 ml of toluene was introduced, and the liquid phase and the gas phase were saturated with ethylene at a flow rate of 100 l/hr. To the autoclave, 1.25 mmol (in terms of aluminum atom) of methylaluminoxane was added, and then 0.005 mmol of the transition metal compound shown in Table 1 was successively added to initiate polymerization. The reaction was conducted at 25° C. for the period of time shown in Table 1 in an atmosphere of an ethylene gas at ordinary pressure. Then, a small amount of isobutyl alcohol was added to terminate the polymerization. After the polymerization was completed, the reaction product was introduced into a large amount of methanol to precipitate the total amount of a polymer. Then, hydrochloric acid was added, and the mixture was filtered through a glass filter. The resulting polymer was vacuum dried at 80° C. for 10 hours to obtain polyethylene (PE). The results are set forth in Table 1.

TABLE 1

|  | Transition metal compound | Polymerization time (min) | Yield of polymer (g) | Polymerization activity *1 | Intrinsic viscosity (η) (dl/g) |
| --- | --- | --- | --- | --- | --- |
| Ex. 1 | 1-A | 5 | 0.94 | 2.27 | 2.03 |
| Ex. 2 | 1-B | 30 | 0.52 | 0.21 | 18.3 |
| Ex. 3 | 2-A | 30 | 0.16 | 0.06 | 13.0 |
| Ex. 4 | 3-A | 30 | 0.09 | 0.04 | 9.56 |
| Ex. 5 | 3-B | 30 | 0.16 | 0.07 | 12.0 |
| Ex. 6 | 4-A | 5 | 1.32 | 3.17 | 13.9 |
| Ex. 7 | 4-B | 30 | 0.34 | 0.13 | 4.64 |
| Ex. 8 | 4-C | 30 | 0.02 | 0.01 | 5.10 |
| Ex. 9 | 5-A | 30 | 0.29 | 0.11 | 18.6 |
| Ex. 10 | 6-A | 30 | 0.08 | 0.04 | 15.0 |
| Ex. 11 | 7-A | 20 | 0.29 | 0.17 | 2.25 |
| Ex. 12 | 8-A | 10 | 0.76 | 0.91 | 30.3 |
| Ex. 13 | 9-A | 10 | 0.33 | 0.36 | 2.01 |
| Ex. 14 | 10-A | 20 | 0.29 | 0.17 | 11.0 |
| Ex. 15 | 11-A | 5 | 0.91 | 2.19 | 5.57 |
| Ex. 16 | 12-A | 5 | 1.38 | 3.32 | 2.78 |
| Ex. 17 | 13-A | 10 | 0.02 | 0.02 | 4.37 |
| Ex. 18 | 14-A | 20 | 0.42 | 0.25 | 18.3 |

*1: kg/mmol (transition metal) hr

Examples 19–34

Into a 500 ml glass autoclave thoroughly purged with nitrogen, 250 ml of toluene was introduced, and the liquid phase and the gas phase were saturated with ethylene at a flow rate of 100 l/hr. To the autoclave, 0.25 mmol (in terms of aluminum atom) of triisobutylaluminum was added, and then 0.005 mmol of the transition metal can compound shown in Table 2 was successively added. Thereafter, 0.006 mmol of triphenylcarbeniumtetrakis(pentafluorophenyl)borate was added to initiate polymerization. The reaction was conducted at 25° C. for the period of time shown in Table 2 in an atmosphere of an ethylene gas at ordinary pressure. Then, a small amount of isobutyl alcohol was added to terminate the polymerization. After the polymerization was completed, the reaction product was introduced into a large amount of methanol to precipitate the total amount of a polymer. Then, hydrochloric acid was added, and the mixture was filtered through a glass filter. The resulting polymer was vacuum dried at 80°C. for 10 hours to obtain polyethylene (PE). The results are set forth in Table 2.

TABLE 2

|  | Transition metal compound | Polymerization time (min) | Yield of polymer (g) | Polymerization activity *1 | Intrinsic viscosity (η) (dl/g) |
| --- | --- | --- | --- | --- | --- |
| Ex. 19 | 1-A | 10 | 0.20 | 0.24 | 29.8 |
| Ex. 20 | 1-B | 30 | 0.11 | 0.04 | 24.3 |
| Ex. 21 | 2-A | 30 | 0.30 | 0.12 | 30.4 |
| Ex. 22 | 3-A | 30 | 0.10 | 0.04 | 16.1 |
| Ex. 23 | 3-B | 30 | 0.16 | 0.07 | 12.0 |
| Ex. 24 | 4-A | 5 | 1.10 | 2.64 | 21.3 |
| Ex. 25 | 4-B | 30 | 0.21 | 0.08 | 7.04 |
| Ex. 26 | 5-A | 5 | 0.67 | 1.62 | 24.9 |
| Ex. 27 | 7-A | 20 | 0.09 | 0.06 | 11.1 |

TABLE 2-continued

|  | Transition metal compound | Polymerization time (min) | Yield of polymer (g) | Polymerization activity *1 | Intrinsic viscosity (η) (dl/g) |
| --- | --- | --- | --- | --- | --- |
| Ex. 28 | 8-A | 30 | 0.24 | 0.10 | 22.0 |
| Ex. 29 | 9-A | 30 | 0.07 | 0.03 | 10.5 |
| Ex. 30 | 10-A | 10 | 0.46 | 0.55 | 30.9 |
| Ex. 31 | 11-A | 30 | 0.20 | 0.08 | *2 |
| Ex. 32 | 12-A | 10 | 0.25 | 0.30 | *2 |
| Ex. 33 | 13-A | 10 | 0.06 | 0.08 | 23.0 |
| Ex. 34 | 14-A | 10 | 0.78 | 0.94 | *2 |

*1: kg/mmol (transition metal) hr
*2: unmeasurable (The polymer under test was insoluble in a solvent for measuring intrinsic viscosity.)

Examples 35–39

Into a 500 ml glass autoclave thoroughly purged with nitrogen, 250 ml of toluene was introduced, and the liquid phase and the gas phase were saturated with a mixed gas of ethylene (flow rate: 50 l/hr) and propylene (flow rate: 150 l/hr). To the autoclave, 1.25 mmol (in terms of aluminum atom) of methylaluminoxane was added, and then 0.005 mmol of the transition metal compound shown in Table 3 was successively added to initiate polymerization. The reaction was conducted at 25 C. for the period of time shown in Table 3 in an atmosphere of the mixed gas at ordinary pressure. Then, a small amount of isobutyl alcohol was added to terminate the polymerization. After the polymerization was completed, the reaction product was introduced into a large amount of methanol to precipitate the total amount of a polymer. Then, hydrochloric acid was added, and the mixture was filtered through a glass filter. The resulting polymer was vacuum dried at 80° C. for 10 hours to obtain an ethylene/propylene copolymer (EPR). The results are set forth in Table 3.

TABLE 3

|  | Transition metal compound | Polymerization time (min) | Yield of polymer (g) | Polymerization activity *1 | Intrinsic viscosity (η) (dl/g) | Content of propylene (mol %) |
| --- | --- | --- | --- | --- | --- | --- |
| Ex. 35 | 1-A | 60 | 0.30 | 0.02 | 4.94 | 30.7 |
| Ex. 36 | 4-A | 30 | 2.25 | 0.90 | 8.52 | 29.9 |
| Ex. 37 | 8-A | 30 | 0.37 | 0.15 | 17.5 | 34.2 |
| Ex. 38 | 11-A | 30 | 0.90 | 0.36 | 6.43 | 51.2 |
| Ex. 39 | 12-A | 30 | 0.77 | 0.31 | 4.44 | 34.7 |

*1: kg/mmol (transition metal) hr

Example 40–42

Into a 500 ml glass autoclave thoroughly purged with nitrogen, 250 ml of toluene was introduced, and the liquid phase and the gas phase were saturated with a mixed gas of ethylene (flow rate: 50 l/hr) and propylene (flow rate: 150 l/hr). To the autoclave, 0.25 mmol (in terms of aluminum atom) of triisobutylaluminum was added, and then 0.005 mmol of the transition metal compound shown in Table 4 was successively added. Thereafter, 0.006 mmol of triphenylcarbeniumtetrakis(pentafluorophenyl)borate was added to initiate polymerization. The reaction was conducted at 50° C. for the period of time Shown in Table 4 in an atmosphere of the mixed gas at ordinary pressure. Then, a small amount of isobutyl alcohol was added to terminate the polymerization. After the polymerization was completed, the reaction product was introduced into a large amount of methanol to precipitate the total amount of a polymer. Then, hydrochloric acid was added, and the mixture was filtered through a glass filter. The resulting polymer was vacuum dried at 80° C. for 10 hours to obtain an ethylene/propylene copolymer(EPR). The results are set forth in Table 4.

TABLE 4

| | Transition metal compound | Polymerization time (min) | Yield of polymer (g) | Polymerization activity *1 | Intrinsic viscosity (η) (dl/g) | Content of propylene (mol %) |
|---|---|---|---|---|---|---|
| Ex. 40 | 4-A | 30 | 0.20 | 0.08 | 4.08 | 8.4 |
| Ex. 41 | 5-A | 30 | 0.08 | 0.03 | 27.9 | 12.0 |
| Ex. 42 | 14-A | 30 | 0.12 | 0.05 | 27.8 | 9.2 |

*1: kg/mmol (transition metal) hr

Examples 43–45

Into a 500 ml glass autoclave thoroughly purged with nitrogen, 250 ml of toluene was introduced, and the liquid phase and the gas phase were saturated with ethylene at a flow rate of 100 l/hr. Then, 1-hexene in the amount shown in Table 5 was further introduced. To the autoclave, 1.25 mmol (in terms of aluminum atom) of methylaluminoxane was added, and then 0.005 mmol of the transition metal compound shown in Table 5 was successively added to initiate polymerization. The reaction was conducted at 25° C. for the period of time shown in Table 5 in an atmosphere of an ethylene gas at ordinary pressure. Then, a small amount of isobutyl alcohol was added to terminate the polymerization. After the polymerization was completed, the reaction product was introduced into a large amount of methanol to precipitate the total amount of a polymer. Then, hydrochloric acid was added, and the mixture was filtered through a glass filter. The resulting polymer was vacuum dried at 80° C. for 10 hours to obtain polyethylene (PE). The results are set forth in Table 5.

TABLE 5

| | Transition metal compound | Amount of 1-hexene (ml) | Polymerization time (min) | Yield of polymer (g) | Polymerization activity *1 | Intrinsic viscosity (η) (dl/g) | Content of 1-hexene (mol %) |
|---|---|---|---|---|---|---|---|
| Ex. 43 | 4-A | 5 | 5 | 2.10 | 5.04 | 7.65 | 1.5 |
| Ex. 44 | 4-A | 10 | 5 | 1.24 | 2.97 | 6.73 | 2.0 |
| Ex. 45 | 4-A | 15 | 5 | 0.94 | 2.26 | 5.27 | 2.9 |

*1: kg/mmol (transition metal) hr

In the measurement of an intrinsic viscosity of the polymer obtained in each example, the polymer was dissolved in decalin and the intrinsic viscosity was measured at 135° C. using a Ubbelohde viscometer.

The content of propylene or 1-hexene in the copolymer was measured by IR analysis (Nippon Bunko FTIR-350).

What is claimed is:

1. An olefin polymerization catalyst comprising (A) a transition metal compound represented by the following formula (I):

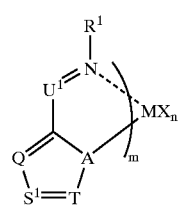

(I)

wherein M is a transition metal atom selected from the group consisting of Group 3 to Group 5, Group 7 to Group 9 and Group 11 of the periodic table, $U^1$ is a carbon atom having a substituent group $R^2$, a nitrogen atom or a phosphorous atom, A is a nitrogen atom or a phosphorous atom, Q is a carbon atom having a substituent group $R^3$, a nitrogen atom or a phosphorous atom, $S^1$ is a carbon atom having a substituent group $R^4$, a nitrogen atom or a phosphorous atom, T is a carbon atom having a substituent group $R^5$, a nitrogen atom or a phosphorous atom, m is an integer of 2 to 6, $R^1$ to $R^5$ may be the same or different, $R^1$ to $R^5$ are each a hydrogen atom, a halogen atom, a hydrocarbon group, a heterocyclic compound residual group, an oxygen-containing group, a nitrogen-containing group, a boron-containing group, a sulfur-containing group, a phosphorous-containing group, a silicon-containing group, a germanium-containing group or a tin-containing group;

two or more of $R^1$ to $R^5$ may be bonded to each other to form a ring, and one group of $R^1$ to $R^5$ contained in one ligand and one group of $R^1$ to $R^5$ contained in another ligand may form a bridging group or a single bond, wherein when one group of $R^1$ in one ligand and one group of $R^1$ contained in another ligand form a bridging group, the bridging group is a hydrocarbon group having 3 or more carbons atoms;

n is a number satisfying the valence of M, and

X is a hydrogen atom, a halogen atom, a hydrocarbon group, an oxygen-containing group, a sulfur-containing group, a nitrogen-containing group, a boron-containing group, an aluminum-containing group, a phosphorous-containing group, a halogen-containing group, a heterocyclic compound residual group, a silicon-containing group, a germanium-containing group or a tin-containing group and when n is 2 or greater, plural groups indicated by X may be the same or different to each other and plural groups indicated by X may be bonded to each other to form a ring.

2. An olefin polymerization catalyst comprising:

(A) a transition metal compound represented by formula (I),

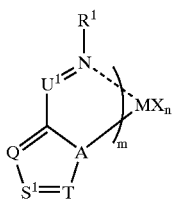

(I)

wherein M is a transition metal atom selected from the group consisting of Group 3 to Group 5, Group 7 to Group 9 and Group 11 of the periodic table, $U^1$ is a carbon atom having a substituent group $R^2$, a nitrogen atom or a phosphorous atom, A is a nitrogen atom or a phosphorous atom, Q is a carbon atom having a substituent group $R^3$, a nitrogen atom or a phosphorous atom, $S^1$ is a carbon atom having a substituent group $R^4$, a nitrogen atom or a phosphorous atom, T is a carbon atom having a substituent group $R^5$, a nitrogen atom or a phosphorous atom, m is an integer of 2 to 6, $R^1$ to $R^5$ may be the same or different, $R^1$ to $R^5$ are each a hydrogen atom, a halogen atom, a hydrocarbon group, a heterocyclic compound residual group, an oxygen-containing group, a nitrogen-containing group, a boron-containing group, a sulfur-containing group, a phosphorous-containing group, a silicon-containing group, a germanium-containing group or a tin-containing group;

two or more of $R^1$ to $R^5$ may be bonded to each other to form a ring, and one group of $R^1$ to $R^5$ contained in one ligand and one group of $R^1$ to $R^5$ contained in another ligand may form a bridging group or a single bond, wherein when one group of $R^1$ in one ligand and one group of $R^1$ contained in another ligand form a bridging group, the bridging group is a hydrocarbon group having 3 or more carbons atoms;

n is a number satisfying the valence of M, and

X is a hydrogen atom, a halogen atom, a hydrocarbon group, an oxygen-containing group, a sulfur-containing group, a nitrogen-containing group, a boron-containing group, an aluminum-containing group, a phosphorous-containing group, a halogen-containing group, a heterocyclic compound residual group, a silicon-containing group, a germanium-containing group or a tin-containing group and when n is 2 or greater, plural groups indicated by X may be the same or different to each other and plural groups indicated by X may be bonded to each other to form a ring;

and (B) at least one compound selected from the group consisting of:
(B-1) an organometallic compound,
(B-2) an organoaluminum oxy-compound, and
(B-3) a compound which reacts with the transition metal compound (A) to form an ion pair.

3. An olefin polymerization catalyst comprising a carrier (C) in addition to the transition metal compound (A) of claim 1 and at least one compound (B) selected from the group consisting of an organometallic compound (B-1), an organoaluminum oxy-compound (B-2) and a compound (B-3) which reacts with said transition metal compound (A) to form an ion pair.

4. A process for olefin polymerization, comprising polymerizing or copolymerizing an olefin in the presence of the olefin polymerization catalyst of any one of claims 1 to 3.

5. An olefin polymerization catalyst of claim 1 wherein the hydrocarbon group of $R^1$ to $R^5$ is selected from the group consisting of an aliphatic hydrocarbon, an alicyclic hydrocarbon and an aromatic hydrocarbon.

6. An olefin polymerization catalyst of claim 5 wherein the aliphatic hydrocarbon group is selected from the group consisting of a straight-chain or branched alkyl group of 1 to 30 carbon atoms, a straight chain or branched alkenyl group of 2 to 30 carbon atoms, and a straight-chain or branched alkenyl group of 2 to 30 carbon atoms.

7. An olefin polymerization catalyst of claim 5 wherein the alicyclic hydrocarbon group is selected from the group consisting of a cyclic saturated hydrocarbon group of 3 to 30 carbon atoms and a cyclic unsaturated hydrocarbon group of 5 to 30 carbon atoms.

8. An olefin polymerization catalyst of claim 5 wherein the aromatic hydrocarbon group is selected from the group consisting of an aryl group of 6 to 30 carbon atoms and an alkyl-substituted aryl group.

9. An olefin polymerization catalyst of claim 8 wherein the aryl group of 6 to 30 carbon atoms is selected from the group consisting of a phenyl, a benzyl, a naphthyl, a biphenyl, a terphenyl, a phenanthryl and an anthryl.

10. An olefin polymerization catalyst of claim 1 wherein the heterocyclic compound residual group of $R^1$ to $R^5$ is a cyclic group containing 1 to 5 hetero atoms therein.

11. An olefin polymerization catalyst of claim 10 wherein the hetero atom of the hetorocyclic group of $R^{1-5}$ is selected from the group consisting of O, N, S, P and B.

12. An olefin polymerization catalyst of claim 10 wherein the cyclic group of the hetorocyclic group of $R^{1-5}$ is a monocyclic or polycyclic ring of 4 to 7 members.

13. An olefin polymerization catalyst of claim 1 wherein the heterocyclic compound residual group of $R^1$ to $R^5$ is selected from the group consisting of pyrrole, pyridine, pyrimidine, quinoline, triazine, furan, pyran and thiophene.

14. An olefin polymerization catalyst of claim 1 wherein the oxygen-containing group of $R^1$ to $R^5$ is selected from the group consisting of an alkoxy, an aryloxy, an ester, an ether, an acyl, a carboxyl, a carbonato, a hydroxyl, a peroxy and a carboxylic anhydride.

15. An olefin polymerization catalyst of claim 1 wherein the nitrogen-containing group of $R^1$ to $R^5$ is selected from the group consisting of an amino, an imino, an amido, an imido, a hydrazino, a hydrazono, a nitro, a nitroso, a cyano, an isocyano, a cyanic ester, an amidino, a diazo and an ammonium salt derived from an amino.

16. An olefin polymerization catalyst of claim 1 wherein the sulfur-containing group of $R^1$ to $R^5$ is selected from the group consisting of a mercapto, a thioester, a dithioester, an alkylthio, an arylthio, a thioacyl, a thioether, a thiocyanic ester, an isothiocyanic ester, a sulfonic ester, a sulfonamido, a thiocarboxyl, a dithiocarboxyl, a sulfo, a sulfonyl, a sulfinyl, a sulfenyl, a sulfonato and a sulfinato.

17. An olefin polymerization catalyst of claim 1 wherein the silicon-containing group of $R^1$ to $R^5$ is selected from the group consisting of a silyl and a siloxy.

18. An olefin polymerization catalyst of claim 1 wherein the phosphorus-containing group of $R^1$ to $R^5$ is selected from the group consisting of a phosphino, a phosphoryl, a thiophosphoryl and a phosphono.

* * * * *